（12）United States Patent
Savage et al.

(10) Patent No.: US 12,210,488 B2
(45) Date of Patent: *Jan. 28, 2025

(54) DISTRIBUTED DATA SYSTEM WITH DOCUMENT MANAGEMENT AND ACCESS CONTROL

(71) Applicant: UNICOM SYSTEMS, INC., Mission Hills, CA (US)

(72) Inventors: Bret Savage, Mission Hills, CA (US); Casey Marshall, Mission Hills, CA (US); Geoffrey Stutchman, Mission Hills, CA (US); Ross Eltherington, Mission Hills, CA (US); Steve Owens, Mission Hills, CA (US); George Northup, Mission Hills, CA (US)

(73) Assignee: UNICOM SYSTEMS, INC., Mission Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,517

(22) Filed: Sep. 15, 2014

(65) Prior Publication Data
US 2015/0127607 A1  May 7, 2015

Related U.S. Application Data

(63) Continuation-in-part of application No. 13/738,796, filed on Jan. 10, 2013.
(Continued)

(51) Int. Cl.
*G06F 16/17* (2019.01)
*G06F 16/16* (2019.01)
(Continued)

(52) U.S. Cl.
CPC .......... *G06F 16/178* (2019.01); *G06F 16/162* (2019.01); *G06F 16/1727* (2019.01);
(Continued)

(58) Field of Classification Search
CPC ........... G06F 17/30174; G06F 11/1402; G06F 17/30117; G06F 17/30138;
(Continued)

(56) References Cited

U.S. PATENT DOCUMENTS 7,126,909 B2 * 10/2006 Matsuura ........... H04Q 11/0478
370/229
7,155,487 B2 * 12/2006 Yau ....................... H04L 67/104
709/213
(Continued)

*Primary Examiner* — Hicham Skhoun
(74) *Attorney, Agent, or Firm* — Baker, Donelson, Bearman, Caldwell & Berkowitz, P.C.

(57) ABSTRACT

Data management systems and methods include a cloud-based platform coupled to a system of agents or folders hosted on client devices. The platform does not store actual data but instead makes use of metadata provided by the agents to track a location of all data in the system and manage the distributed storage, movement and processing of the actual data among the agents. In so doing, the platform pools networked storage into "virtual clusters" using local storage at the agents. The agents collectively monitor, store, and transfer or move data, and perform data processing operations as directed by the platform, as described in detail herein. The agents include agents hosted on or coupled to processor-based devices, agents hosted on devices of a local area network, agents hosted on devices of a wide area network, agents hosted on mobile devices, and agents hosted on cloud-based devices.

125 Claims, 20 Drawing Sheets

Related U.S. Application Data

(60) Provisional application No. 61/877,585, filed on Sep. 13, 2013.

(51) Int. Cl.
| | | |
|---|---|---|
| *G06F 16/178* | (2019.01) | |
| *G06F 16/18* | (2019.01) | |
| *G06F 16/182* | (2019.01) | |
| *G06F 16/21* | (2019.01) | |
| *G06F 16/245* | (2019.01) | |
| *G06F 16/25* | (2019.01) | |
| *G06F 21/62* | (2013.01) | |
| *H04L 67/1097* | (2022.01) | |

(52) U.S. Cl.
CPC ........ *G06F 16/182* (2019.01); *G06F 16/1873* (2019.01); *G06F 16/21* (2019.01); *G06F 16/245* (2019.01); *G06F 16/25* (2019.01); *G06F 21/6218* (2013.01); *H04L 67/1097* (2013.01)

(58) Field of Classification Search
CPC ........... G06F 17/30194; G06F 17/3023; G06F 17/30289; G06F 17/30424; G06F 17/30557; G06F 21/6218; G06F 16/178; G06F 16/25; G06F 16/182; G06F 16/21; G06F 16/162; G06F 16/245; G06F 16/1727; G06F 16/1873; H04L 67/1097
USPC ........................................................ 707/610
See application file for complete search history.

(56) References Cited

U.S. PATENT DOCUMENTS

| | | | | |
|---|---|---|---|---|
| RE42,153 E | * | 2/2011 | Hubbard | G06F 11/3672 709/201 |
| 8,108,912 B2 | * | 1/2012 | Ferris | G06F 21/606 709/201 |
| 8,341,222 B2 | * | 12/2012 | Murayama | G06F 17/30011 704/10 |
| 8,452,731 B2 | * | 5/2013 | Preslan | G06F 11/1453 707/652 |
| 2010/0161759 A1 | * | 6/2010 | Brand | H04L 67/1097 709/218 |
| 2010/0179940 A1 | * | 7/2010 | Gilder | G06F 16/258 707/622 |

* cited by examiner

DISTRIBUTED DATA SYSTEM WITH DOCUMENT MANAGEMENT AND ACCESS CONTROL

RELATED APPLICATION

This application claims the benefit of United States (U.S.) Patent Application No. 61/877,585, filed Sep. 13, 2013.

This application is a continuation in part of U.S. patent application Ser. No. 13/738,796, filed Jan. 10, 2013.

TECHNICAL FIELD

Embodiments described herein relate to data processing and, more particularly, to distributed storage and processing.

BACKGROUND

Cloud-based services are rapidly expanding and customers are expanding beyond local customer provided equipment (CPE) solutions to include cloud-based services to increase productivity, lower support costs, and reduce up-front investments. Hybrid solutions that combine both CPE with cloud solutions are being adopted rapidly given that a local/cloud approach leverages existing investments and has less risk than a complete migration to the cloud. Conventional cloud services include personal synchronization and sharing services, online backup, and large file transfer services. While these conventional cloud services have focused on online storage offerings, the ever increasing number of connected computers, devices and web sites, has meant that users of these services continue to experience difficultly synchronizing and accessing their latest files across multiple devices or via the web. Further, corporate users require relatively high levels of security to protect their business data, and high-profile security breaches and long term viability of cloud storage providers has added to the issues associated with migrating storage and services to the cloud. Consequently, there is a need for a cloud service having a streamlined approach to synchronization and access of files across multiple devices, while also focusing on local data storage and peer-to-peer transfer, as well as relatively higher levels of security.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 15 shows an example screen including document audit trails, under an embodiment.

FIG. 16 shows an example screen including file search and categorization, under an embodiment.

DETAILED DESCRIPTION

Data management systems and methods are described that include a cloud-based platform or engine coupled to a system of agents or folders hosted on client devices. The platform of an embodiment does not store actual data but instead makes use of metadata provided by the agents to track a location of all data in the system and manage the distributed storage, movement and processing of the actual data among the agents. In so doing, the system of an embodiment pools networked storage into "virtual clusters" using local storage at the agents. The agents collectively monitor, store, and transfer or move data, and perform data processing operations as directed by the platform, as described in detail herein. The agents of an embodiment include agents hosted on or coupled to processor-based devices (e.g., personal computers (PCs), tablet computers, server computers, Network-Attached Storage (NAS) devices, Apple computers, mobile devices, iOS devices, Android devices, etc.), agents hosted on devices of a local area network (LAN), agents hosted on devices of a wide area network (WAN), agents hosted on mobile devices, and agents hosted on cloud-based devices (e.g., servers, storage devices, etc.), but are not so limited.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, any claimed invention.

Figure 1:
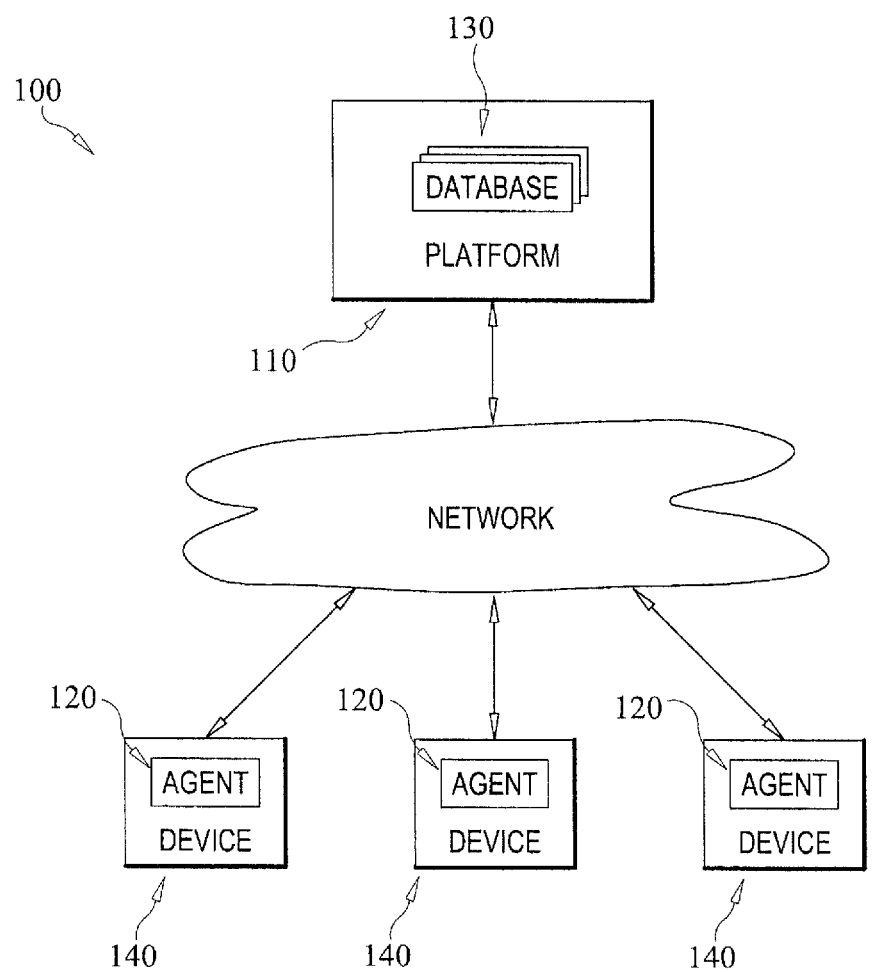
FIG. 1 is a block diagram of the system including the platform and agents, under an embodiment.

FIG. 1 is a block diagram of a system including the platform 110 and agents 120, under an embodiment. In this embodiment, the platform is coupled to and/or includes numerous databases 130, as described in detail herein. A number of client devices 140, each of which include or host an agent, are coupled to the platform and the databases via a network coupling and make use of the databases to receive and execute work tasks as directed by the platform.

Figure 2:
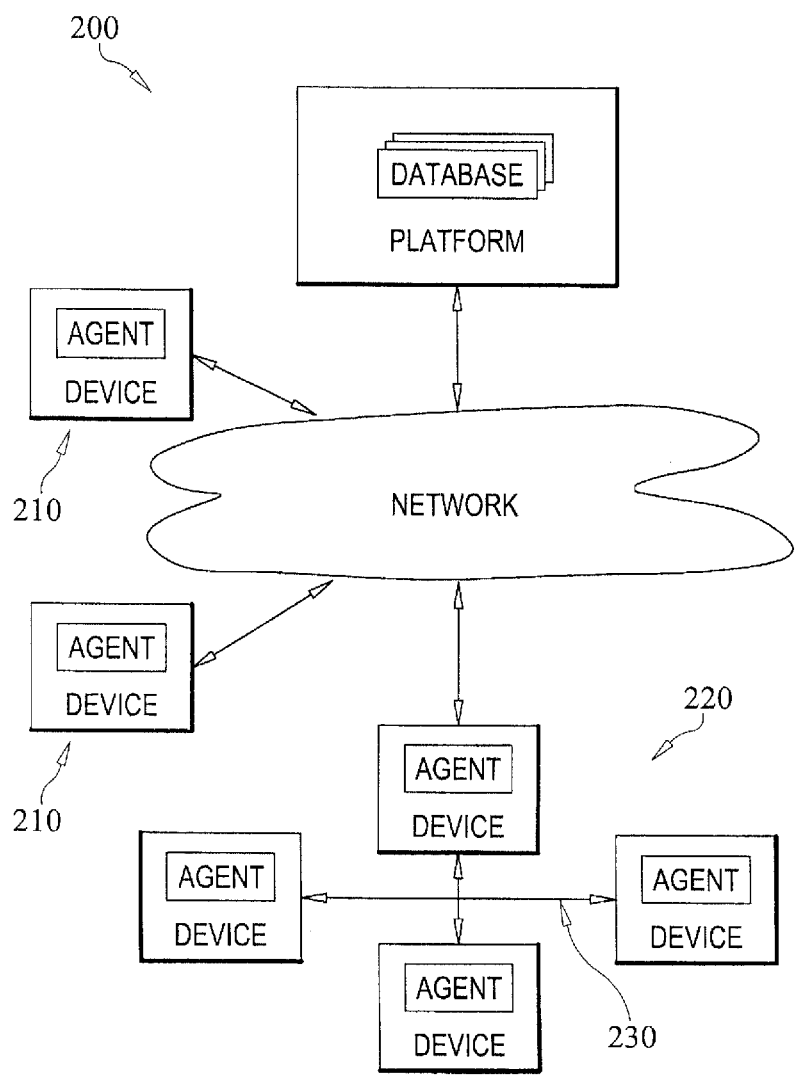
FIG. 2 is a block diagram of the system including the platform coupled to a group of independent agents and a group of networked agents, under an embodiment.

FIG. 2 is a block diagram of a system including the platform coupled to a group of independent agents and a group of peer agents, under an embodiment. The platform of this embodiment is coupled to and/or includes numerous databases, as described in detail herein. The client devices are coupled to the platform via network couplings. A first group of client devices 210 includes a number of client devices, each of which include or host an agent and is independently coupled to the platform via a network coupling. A second group of client devices 220 includes a number of client devices that each include an agent and independently couple to the platform and, additionally, form a peer network (e.g., LAN, WAN, etc.) in which peer-to-peer communications 230 are supported between the agents.

Figure 3:
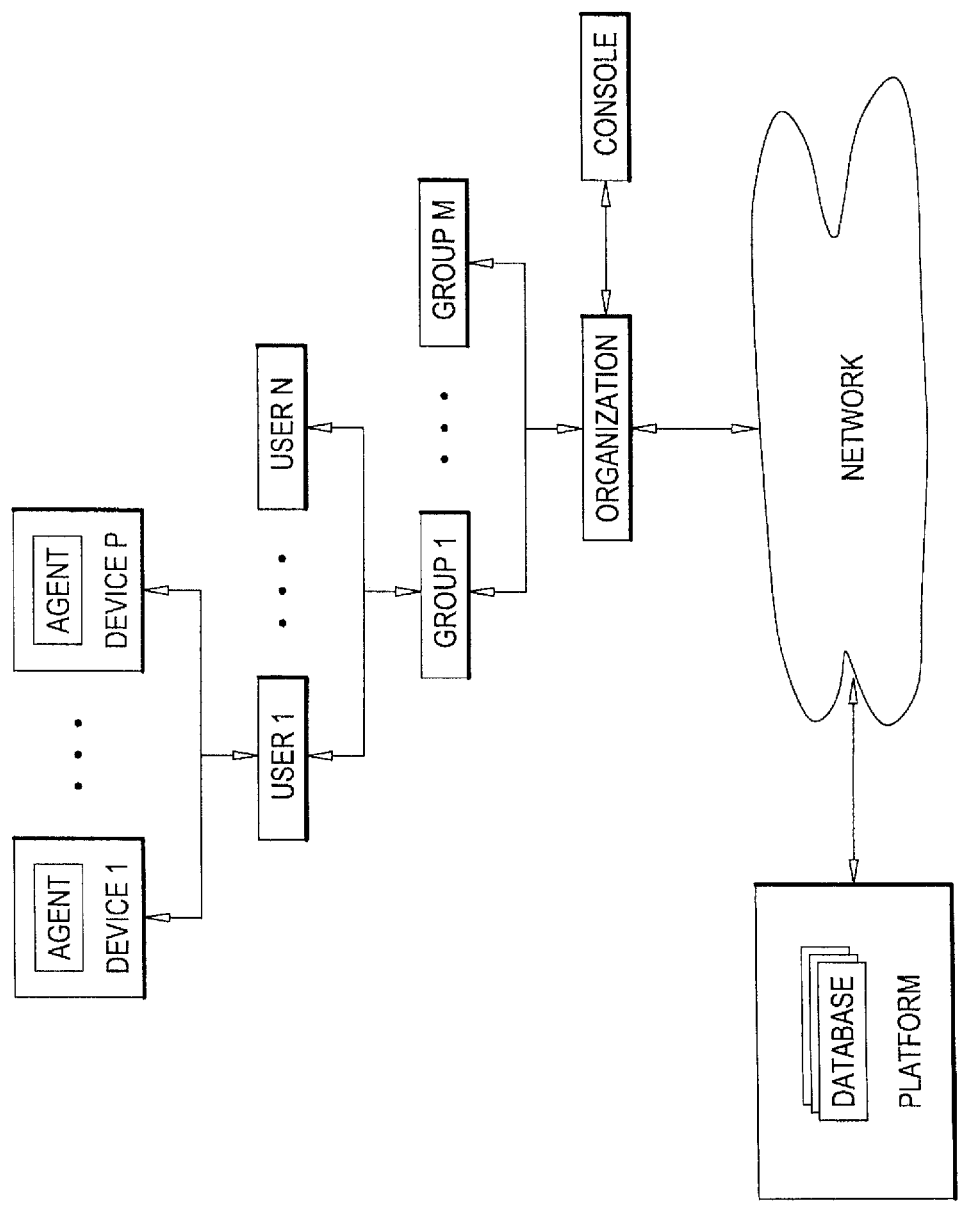
FIG. 3 is a block diagram of the system including the platform and numerous agents that are included in an organization, under an embodiment.

FIG. 3 is a block diagram of a system including the platform and numerous peer agents that are included in an organization, under an embodiment. The platform is coupled to and/or includes numerous databases, as described in detail herein. The organization includes a number of groups (e.g., group 1 to group M, where M is any number), and each group includes some number of users (e.g., user 1 to use N, where N is any number). Each user of the organization includes some number of devices (e.g., device 1 to device P, where P is any number), and each device includes or hosts an agent that is coupled to the platform via a network coupling. The organization also includes an administrator console that couples to the platform and enables an administrator to access the devices according to the hierarchy. The platform includes controls or rules that control access to the data according to the organization, and the console provides access to the controls or rules and thereby allows the administrator to setup and maintain (e.g., add, delete, modify, etc.) the rules.

Under this organizational example, the agents are directed by and execute instructions received from the platform, and each agent is hosted on a device that is registered to a user. Each user is a subset of a group, and each group is a subset of an organization. The agents on each device index the contents of the memory included on or accessible by the corresponding device, and provide the metadata of the memory contents to the platform. The console provides an administrator control over rules that control access to the data according to the organization. For example, an administrator can generate a rule specifying that an organization cannot include any file that exceeds a size of 10 MB. An administrator can generate another rule specifying that Group 1 cannot include any music file or video file. Yet another example rule specifies that Group 2 cannot include any file marked confidential.

Figure 4A:
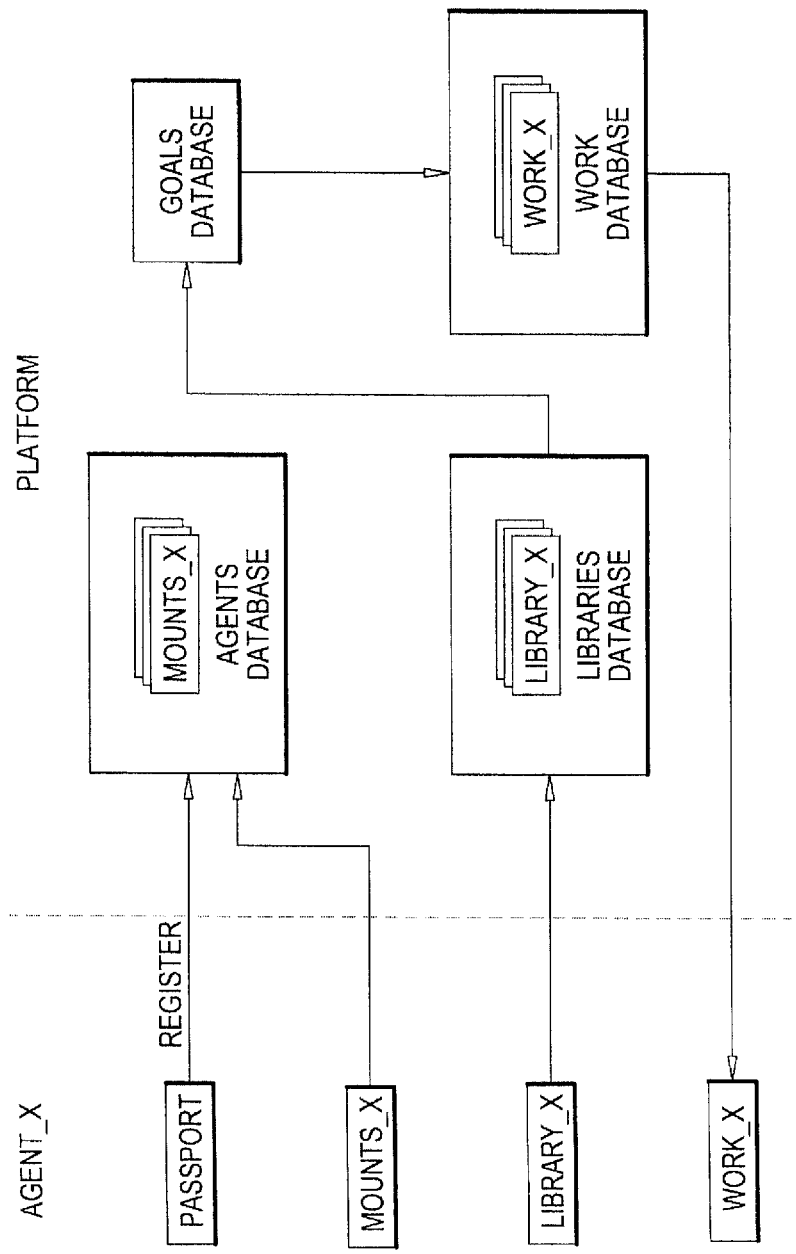
FIG. 4A is a block diagram of an example system including the platform and an agent, under an embodiment.
Figure 4B:
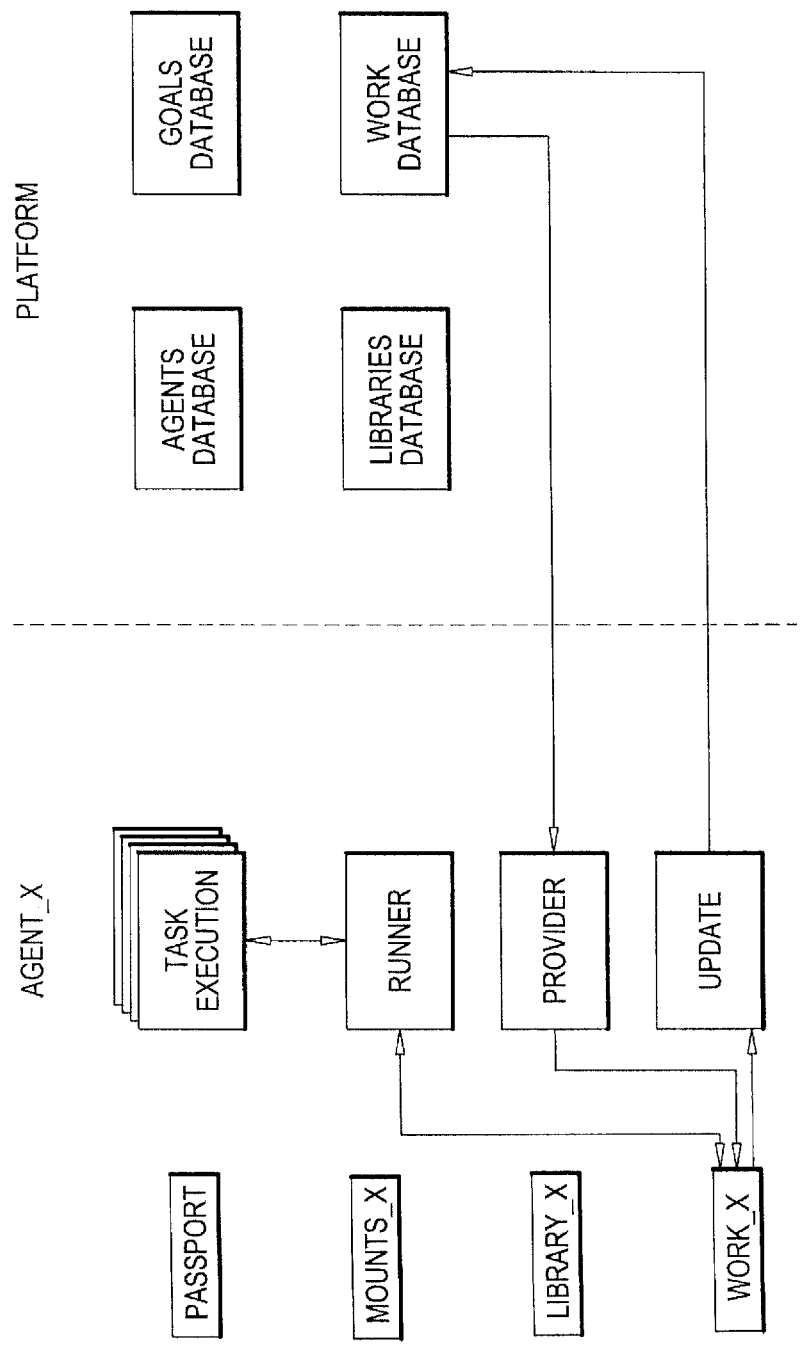
FIG. 4B is another block diagram of an example system including the platform and an agent, under an embodiment.

FIG. 4A is a block diagram of an example system including the platform and an agent, under an embodiment. FIG. 4B is another block diagram of an example system including the platform and an agent, under an embodiment. FIGS. 4A and 4B are collectively referred to herein as "FIG. 4." The platform uses knowledge of the data accessible by each agent gained via metadata to create or generate work and assign the work to agents. The agents in turn perform work assigned to them by the platform and provide to the platform information of their data and work performed. Because the agents of an embodiment perform work as directed by the platform, they are not applications and not users.

The platform includes and/or is coupled to a variety of databases. For example, the platform includes an agent database that is a list of all agents available to the platform and the relevant information of each agent. In addition to the agent database, the platform comprises other databases for use by the agents in exchanging information in support of tracking a location of all data in the system and managing the distributed storage, movement and processing of the actual data among the agents. The databases include but are not limited to the agent database, as described above, a libraries database, a goals database, a work database. Each agent can have one or more libraries that represent their local disk or storage, and the libraries database includes a list of the storage available to a corresponding agent, where the storage includes but is not limited to any device to which the agent has been granted read and/or write access (e.g., a disk or disk drive, network mount point, hard drive, flash drive, storage service, etc.). The platform and each agent comprise a libraries database that includes a list of libraries of the system and each corresponding agent of the system that can access each library.

The goals database includes a list of goals which are collections of libraries on which a particular task is to be performed (e.g., synchronized). The goals are used by agents to perform tasks, where goals correspond to one or more libraries and are used to carry out tasks or work on the contents of the library. Furthermore, the platform generates a work database for each agent, and puts the work tasks that are to be accomplished by the corresponding agent in the work database. The work database includes a description of each task that is to be performed by an agent along with all information needed by the agent to perform the work. The databases are described in detail herein.

The platform of an embodiment is a universal synchronization (sync) engine that forms a grid through couplings among the platform and numerous agents, where the platform acts as the master controller for the agents. The platform includes or is coupled to one or more databases in the cloud, and the databases comprise information received from the agents that includes data (e.g., metadata) on the location and state of all data of the grid for which the platform has responsibility. The agents are hosted or installed on particular devices or computers and, as such, are independently functioning entities that can communicate with and work in cooperation with the platform and with other agents to form the grid, where the components of the grid work cooperatively to achieve particular tasks as assigned by the platform.

In operation, an agent is hosted or installed on a device, and the agent functions to perform the work or tasks assigned to it by the platform. The platform knows the identity and location of all agents with which it is associated, and the data to which each agent has access. The agents are not applications, but are instead agents of the platform that communicate via encrypted channels with both the platform and with other agents to perform work as directed by the platform. Generally, the platform generates and includes goals for which it is responsible, and the platform assigns work or tasks to the agents and manages the agents to accomplish the goals. Further, the agents require no knowledge of the objectives that correspond to the tasks assigned the respective agent or any other agent.

The platform of an embodiment does not store actual data in the databases of an embodiment but, instead, stores metadata corresponding to the data for which it is responsible. Consequently, as the platform stores only metadata, the agents serve as distributed data storage entities at which actual data is stored. The platform uses the metadata for a bit-level understanding of the data stored at the agents, thereby providing more than a file-level understanding of the data. The metadata is received from each agent and is generated by the agent from the data for which each respective agent is responsible. In generating metadata, the agents scan files as requested by the platform. For each file, the scanning involves generating fragments or components of data from the data forming the file by splitting the file into variable size fragments referred to herein as blobs. The blobs are generated using a data fingerprinting algorithm that generates portions of data having variable sizes that are between a pre-specified minimum length and maximum length, as described in detail herein. As the embodiments described herein generate blobs from the contents of a file, and the blobs represent the contents of the file, the terms "file(s)" and "blob(s)" are used interchangeably in the description herein.

When generating blobs, a description of the blob is generated that includes a value of the hash at the point where the blob was broken or separated from the remaining portion of the file, a hash of the complete contents of the blob, an offset value based on the break point for the blob, and a size (e.g., length) of the blob. The hash of the complete contents of the blob (blob hash, or "bash") serves as a unique identifier for the blob. Furthermore, a complete list of blobs making up the contents of a file is hashed (cash) to generate a unique identifier for the entire file contents, as is a hash of the combination of the contents hash and the name hash (fash). The hashes of an embodiment further include a hash of the file name and path of a file (pash), and a hash of the file metadata (e.g., file name, size, date, location, etc.) (mash).

These various hashes, all of which are described in detail herein, are generated by each agent for each data file for which the respective agent is responsible, and delivered to the platform. The platform generates a record for each file to include the information of these various hashes. The platform uses the information or state of the data reported to it by the agents and included in these records to determine the state of the data and to determine which agents have versions of data that are out of date because of modifications to the data, and to reconcile file versions among agents. The platform then issues work to agents needing to update one or more files to a most recent version of the file, as described in detail herein.

Using the metadata, therefore, the platform maintains in the cloud a master index of the data, and uses goals to read master indexes or libraries of the agents to determine the locations of the various pieces of data relating to the respective goals, identify any inconsistencies or discrepancies in the data, and issue or generate work to eliminate any identified inconsistencies or discrepancies. This is in contrast to peer-to-peer systems because agents of an embodiment, instead of being anonymous, are known to and directed by the platform and only exchange content with other agents controlled by and having an identity established at the platform.

The platform finds efficiency in transferring as little data as possible as directly as possible between peers. Also, the embodiments herein use the knowledge gathered by the platform of the location of all data along with cooperative processing among agents to only move data that needs to be moved and to process data at the location (e.g., agent) of the data, thereby providing relatively greater bandwidth than any one agent has when working independently. So, the platform of an embodiment provides data ubiquity by providing efficient storage, delivery, and global data mobility.

The system provides hashing and block-level transfer of data among devices through use of the blobs. The block-level transfer supports efficient synchronizing of files when data changes because there is only a need to update across devices the blocks of data that changed. The block-level transfer further supports non-sequential file transfers because once the data is hashed to form the blobs, the blobs are moved and then reassembled, thereby eliminating the need for sequential file transfer. Similarly, embodiments support a reduction in data upload/download times because the blobs can be simultaneously or near-simultaneously transferred from one or more other devices to any device where they are needed. Moreover, when a file is needed by a particular device on the grid, and it is present at more than one other device on the grid, different blocks can be simultaneously transferred from these multiple devices in order to place the file at the location (e.g., agent) where it is currently needed.

The platform distributes work to agents in a grid and directs the work by generating tasks or work items for particular agents and delivering the work items to the agents. A work item is delivered to an agent along with conditions of completion for that work item, but the embodiment is not so limited. The agents of an embodiment are flexible clients that execute the tasks or work items assigned to them by the platform.

As an example, a work item assigned to the agent directs the agent to scan or monitor a directory or folder on a memory device accessible by the agent, and continuously report any changes to any file in the directory or folder. This work item is used by the platform to initially receive the metadata of files corresponding to the agent upon registration of the agent with the platform, and is also used to continuously update that metadata in response to changes made to the content of the files. Therefore, in response to any change to any file, the scan task causes the agent to report any changes in blobs or metadata of the file to the platform which subsequently assigns work to one or more other agents as appropriate to the reported changes. Furthermore, the platform of an embodiment is used to distribute logic for new functionality to one or more agents. Therefore, if the platform needs the agents to provide new functionality, the logic to enable that functionality can be delivered to the appropriate agents by the platform.

The tasks or work items of an embodiment that are generated by the platform and assigned to the respective agents for execution include scanning, deleting, writing, and uploading. An agent performs the scan task by monitoring a file system or directory recursively and reporting to the platform any changes (e.g., modifications to a file, additions to a file, deletions to a file, renaming of a file, etc.) to any files. The reporting of the change involves placing the modified file in the local database, and the metadata of the local database is subsequently provided to the platform.

The write task of an embodiment involves the writing of blobs, as described in detail herein, but is not so limited. The agent performs the write task by copying one or more blobs of a file from a first location (e.g., source device) to a second location (e.g., destination device). Each of the first location and the second location include locations on a storage device (e.g., from a first location on a hard disk of a computer to a second location on the hard disk of the computer), locations on different storage devices in a same domain, and locations on storage device in two or more different domains (e.g., from a file system of an agent to a cloud-based storage device, from a file system of a first agent to a file system of a second agent via peer-to-peer communications, etc.). The source of an embodiment therefore can be one of a file system of any agent on the grid and a cloud-based or network-based storage device.

A work item is delivered to an agent along with conditions of completion for that work item, as described above. The conditions of completion associated with a write work item include retrieving the blobs or component necessary to complete the write, and that the blob or component being overwritten is the correct file. If the condition is not met that the blob being overwritten is the correct file, then a report of this is made to the platform.

The agent performs the upload task by copying a blob from an agent to a cloud-based storage device. Consequently, when a new file is placed into the file system of an agent, the agent reports the addition of the file to the platform, and the platform assigns work to the agent to copy the file blobs to the cloud-based storage device. In response, the agent determines if the new file exists in the cloud-based database and, if not, copies the file to the cloud-based database.

The work items of an embodiment include three phases that include being queued, pending, and completed (successfully or unsuccessfully). The platform tracks the phases of work items assigned to each agent in order to track the state of files corresponding to the respective agents.

In order to maximize efficiency of communications between the platform and the agents, some information is stored at both the platform and the agents. For example, the agent of an embodiment polls the platform to identify new work items assigned to that agent via the work database, and periodically receives and stores locally the assigned work items of the work database. This reduces the amount of communication between the agent and the server required to download work items to the agent. Likewise, when a new file is identified on an agent, the new file is written to the local library database of the agent, and the local library database is periodically replicated in batches at the platform. This eliminates the requirement for the agent and/or the platform to perform a file transfer upon each occurrence of a new file. Furthermore, and as described in detail herein, the blobs of an embodiment support differential file transfer, and at least some portion of the information used to track blobs and their locations in the system is stored at both the platform and the agents.

Regarding the retrieval of information needed by an agent to perform a work task assigned by the platform, the agent includes a hierarchy to identify the location of information needed to complete the task but not presently in a file possessed by the agent. The hierarchy of an embodiment involves an agent first searching local memory, followed by the use of peer-to-peer communication to retrieve needed information that is not found locally but that is located in a file belonging to a peer. When the needed information is not found locally, and is not located with a peer, the agent retrieves the information from cloud-based storage (e.g., Amazon S3, etc.) or another remote storage entity.

When peer-to-peer communication is used to obtain needed files, the platform provides the agent with a list of peer agents that possess the needed files, but is not so limited. The list of peer agents provided by the platform is an ordered list, thereby enabling the agent to contact peer agents using the order of the list, but the list of alternative embodiments may not be ordered.

Referring to FIG. 4B, the agent of an embodiment includes numerous threads or components that execute in parallel to provide the functionality of the agent. For example, a provider thread retrieves work items designated for an agent from the work item database of the platform, and provides or stores the work item database locally. A runner thread monitors the local work item database of the agent and individually pulls work items from the local work item database, marks the item as pending in the local work item database, and provides the item to the appropriate task execution thread (e.g., a write task is provided to the write thread). When a task execution thread completes execution of a task received from the runner thread, it reports to the runner thread the status of the execution (e.g., successful completion, unsuccessful completion, reason for unsuccessful completion, etc.), and the runner thread reports this status information back to the local work item database. An update thread monitors the local work item database for items marked as completed, and reports the status information of the completed work items back to the platform. The platform in response updates platform databases as appropriate to the completed work by any agent.

The platform of an embodiment operates using metadata of the data corresponding to each agent coupled or connected to the platform as reported to it by the respective agents, as described in detail herein. To generate that metadata for the platform, the agents scan all files they have in the folder that is to be synchronized. The agents create or generate fragments or components of data from the data that makes up the file by splitting files into variable size fragments that are the blobs. The blobs are generated using a fingerprinting algorithm and identified by their blob hash (bash), referred to herein as a bash. More particularly, the agent creates the blob by running a fast-windowed checksum over a pre-specified number of bytes. An embodiment generates portions of data having variable sizes that are between a pre-specified minimum length and maximum length.

The procedure that breaks files into component parts, referred to herein as fingerprinting, involves running a hash algorithm over slices of the data, and the hash algorithm is set to identify a particular pattern of data (e.g., a sequence of twelve "0" bits; a sequence of three "0" bits; a sequence of six "1" bits, etc.). The "size" of each piece is determined through the setting of the hash string, because a continuous string of 12 bits is going to occur less often and thus produce longer data slices than a continuous string of three bits. The fingerprints determine boundaries of blocks of data within a file and these boundaries are used for determining common blocks or portions between two or more files.

A hash is generated for each byte in the file using a hash algorithm over a sliding window of a pre-specified size. For example, in an embodiment, the hash is generated for each byte in the file using a BUZ hash algorithm over a 48-byte window, where the result of application of the hash algorithm is a 64-bit number. When the hash has a particular value (e.g., corresponding to the lower 12 bits all being "0" bits), referred to as a match value, then a break is generated at that point in the file. The match value of an embodiment, for example, occurs when the lower 12 bits of the window are "0" bits.

Upon creation of a blob, a description of the blob is generated that includes a value of the hash at the point where the blob was broken or separated from the remaining portion of the file, a hash of the complete contents of the blob, an offset value based on the break point for the blob, and a size (e.g., length) of the blob. The hash function of an embodiment used to hash the complete contents of the blob is the skein cryptographic hash function (internal state size is 512 bits, producing an output of 160 bits), but the embodiment is not so limited. The hash of the complete contents of the blob serves as a unique identifier for the blob. A file is reported or described as a list of all blobs comprising the file, and this list of file hashes serves as a manifest of the corresponding file contents.

The blobs of an embodiment are stored at a central storage entity, but are not so limited. In so doing, the platform instructs each agent to transfer blobs not previously reported by any agent to a central cloud-based storage entity; as an example the central storage entity can include Amazon Simple Storage Service (S3) available from Amazon Web Services. Therefore, all blobs are stored locally on one or more agents and stored in centralized storage. Subsequently, when an agent reports a blob and the platform determines the blob is not present in the central storage, the platform instructs the agent to transfer that blob to the central storage if it has not been previously reported by another agent.

In addition to the bash described above, the system of an embodiment includes a number of other hashes for use in describing data in the system. For example, the complete list of blobs making up the contents of a file, as described above, is hashed to generate a unique identifier for the complete file. This hash identifier of the complete file, referred to herein as the content hash (cash), allows a quick comparison to determine if two files contain identical content.

Another hash of an embodiment includes a hash of the combination of the contents hash and the name hash, referred to herein as a file hash (fash). The fash thus identifies contents of a file at a specific location.

The hashes of an embodiment further include a path hash and a metadata hash. The path hash or file path hash, referred to herein as the pash, is a hash of the file name and path of a file. The metadata hash, referred to herein as the mash, is a hash of the file metadata (e.g., file name, size, date, location, etc.). The hashes described herein are generated by the agents and delivered to the platform, but are not so limited.

Alternative embodiments use hashing to form blocks of data, as described herein, and store each block with version information. This enables versioning so that subsequently the versioning information is used to reassemble data to create older versions of a file.

Using the hashes of an embodiment a record is generated at the platform for each file, and every record for every file includes the all bashes of the file, as well as the cash, fash, pash, and mash. The library database of an embodiment includes these records for each file, but the embodiment is not limited the inclusion of these records in the library database. The platform uses the information or state of the data reported to it by the agents and included in these records to determine which agents have versions of data that are out of date because of changes or new data, and to reconcile file versions among agents. The platform uses the fash (hash of the file content and file name) to determine the state of a file and whether a file reported by an agent is the most recent version of the file. The platform then issues work to agents needing to update one or more files to a most recent version of the file.

When directed by the platform to locate a particular piece of data or blob each agent first queries a local copy of the file manifest in order to determine if a blob with a specific hash corresponding to the data is available in local storage. When the agent does not locate the file locally, then it uses a peer-to-peer protocol to try to locate the file on a peer agent. When using the peer-to-peer protocol, the agent uses information of a list of agents having the file to selectively locate the file, where the list is received from the platform. Alternative embodiments can include one or more alternative hierarchies for locating data and as such are not limited to peer-to-peer protocols.

Peer-to-peer communication is supported among agents of an embodiment, and in so doing each agent reports to the platform a private IP address and port on which it is listening. Furthermore, the platform observes the public IP address and port of each agent at the time the agent reports the private information (e.g., during registration of the agent, etc.). The platform generates and maintains a list of all agents along with the private IP address and port and public IP address and port of each agent. Subsequently, when a first agent wants to establish peer-to-peer communications with a second agent, the first agent queries and receives from the platform the public and private IP addresses and ports of the second agent and then attempts connects to both using the public and private information.

Peer-to-peer communications between the agents of an embodiment are encrypted using the RSA algorithm for public-key cryptography, but are not so limited. The encryption of an embodiment retains or stores all keys locally within the grid, so no entity outside of the grid can access the unencrypted data. Further, additional data security is realized because no complete file is ever stored at the platform.

In an example involving encrypted peer-to-peer communication among agents, a second agent B wishing to establish communication with a first agent A generates a random secret S that is used to encrypt data for use in symmetric encryption between agents A and B. The second agent B encrypts the secret S using the public key of the first agent A, which it retrieves from the platform, and provides the encrypted secret S to the platform where it is stored. The second agent B communicates to the first agent A that they are going to establish a communication session using a session ID and, in response, the first agent A fetches the encrypted secret S from the platform and decrypts the secret S. The secret is subsequently used by the first agent A and the second agent B to form an encrypted communication channel for peer-to-peer communication.

With reference to FIG. 4, which is a block diagram of an example system including the platform and an agent, the platform creates or generates work and assigns the work to agents, as described in detail herein. The agents in turn perform work assigned to them by the platform and provide to the platform information of their data and work performed. Because the agents of an embodiment perform work as directed by the platform, they are not applications and not users. In operation, each agent registers with the platform using a passport prior to being available for operations. The passport, which in an embodiment is received from the platform, includes keys and information that identifies the corresponding agent. The platform includes an agent database that is a list of all agents available to the platform and the relevant information of each agent, and agents are placed in the agent database by the platform upon registering with the platform.

In addition to the agent database, the platform of an embodiment comprises or is coupled to a number of other databases in the cloud, where the agents and the platform of an embodiment couple to the databases and exchange information using the databases. The databases include but are not limited to the agent database, as described above, a libraries database and a goals database. Each agent can have one or more libraries that represent their local disk or storage, and the libraries database includes a list of the storage available to a corresponding agent. The goals database includes a list of goals which are collections of libraries on which a particular task is to be performed (e.g., synchronized).

Regarding the libraries database, each agent identifies storage mount points, referred to herein as libraries, to the platform. Mounts include but are not limited to any device to which the agent has been granted read and/or write access, for example, a disk or disk drive, network mount point, hard drive, flash drive, and storage service to name a few. The platform and each agent include a global libraries database that includes a list of libraries of the system and each corresponding agent of the system that can access each library.

Additionally, each agent provides information of the contents of each library through the use of periodic "snapshots" or scans of each library, and the agent and platform tracks the current state of all files in the libraries using the information of the snapshots. The libraries database enables queries to locate each library in a grid and identify each agent that can access the library. This architecture enables the agent and the platform to know that if each has access to a library having a particular identification then each is accessing the same library. Thus, each library is presented individually and separately in the libraries database. While the platform and the agent of an embodiment each include a global libraries database that includes information of all libraries of the grid, the embodiment is not so limited. Alternatively, the platform includes a global libraries database of all libraries in the grid, and each agent includes a local libraries database that includes information of the libraries accessible by that particular agent.

The platform also includes goals that are incorporated or used by agents to perform tasks. Goals deal only with libraries instead of dealing with agents, mounts, work, of the like. Goals correspond to one or more libraries and are used to carry out operations or work on the contents of the library. Further, a library can correspond to multiple goals in an embodiment.

The platform of an embodiment includes a work database corresponding to each agent, and the agent receives the work database from the platform. The platform generates the work database for each agent, and puts work tasks that are to be accomplished by the corresponding agent in the work database. The work database includes a description of each task that is to be performed by an agent along with all information needed by the agent to perform the work. Any task placed in the work database by the platform can be dynamically revised and/or deleted in response to other work performed in the grid. For example, if a task is put in the work database to "rename file A as file B," and subsequently file B is to be renamed to file C, then the platform revises the work as "rename file A as file C." Additionally, any task that subsequently becomes obsolete is removed from the work database.

In an embodiment, an agent provides information of its capabilities to the platform. Alternatively, the platform includes or generates a capabilities database comprising global information of capabilities of all agents of the grid.

Agents receive work assignments or tasks generated by the platform via their respective work databases, as described above. Each discrete work item in the work database includes a verb that describes action to be taken by the agent. The tasks or work items that can be executed by the agent of an embodiment include scanning, deleting, writing, and uploading, for example. A work item is delivered to an agent along with conditions of completion for that work item.

For example, the scan task involves reporting to the platform a current state of the files in the agent's library, and reporting to the platform changes made to the contents of the library (e.g., addition of file(s), deletion of file(s), etc.) and changes made to any file of the library.

Another task is an upload task in which the agent locates the appropriate file, breaks the file into blobs, encrypts the blobs, and writes or transfers a list of the blobs that form the file to an object store like a cloud-based storage device. When data is written to the object store, the data is content addressed, so a hash of the blob is transferred to the object store and subsequently used to reference the blob/data (i.e., the file name is the hash).

The tasks of an embodiment also include a write task that involves locating one or more blobs of a file and copying the blobs from a first location (e.g., source device) to a second location (e.g., destination device). In response to a received write task, an agent attempts to locate a blob locally in the corresponding agent library. If the blob is not found locally, the agent attempts to locate the blob at a peer agent that has reported having the blob. If the blob cannot be found at a peer agent, then the agent retrieves the file from the object store (e.g., cloud-based storage device). When an entire file is to be written, a list of blobs is reported or written as the manifest of the file.

With reference to FIG. 4, an example operation involves the synchronization of a document on a device/agent in response to a determination that the version of the document is not the most recent version as found on another device/agent. Following registration of the agent AGENT_X using a passport, the agent is directed to perform a scan to create and provide to the platform a library file that includes the contents of a library LIBRARY_X of the agent. To initiate the scan, the platform adds the scan task to the work database (e.g., WORK_AGENTX) for the particular agent (e.g., AGENT_X), and the platform writes into the work database for the agent all work necessary to synchronize files.

The library LIBRARY_X contains metadata about files that reside on a mount accessible by AGENT_X and includes the metadata that defines a subset of files by library identifiers or filters the files. Thus, the library includes metadata of a set of files present on a mount. The scan is a continuously running job that results in metadata being provided to the platform, where the metadata represents for each library "scanned" the contents of that library (e.g., LIBRARY_X). As a result, generally, a mirror of each library on each agent is created and placed in the library database of the platform such that the library database then includes the filtered metadata based on the application of a particular filter to the mounts accessible by each agent.

As a result of the above operations applied to all agents accessible by the platform, the platform includes metadata of the contents of all files of the agents to which it has access. The platform also includes in the goals database, for purposes of this example, a "sync" goal for LIBRARY_X and LIBRARY_Y (not shown) of another agent (not shown). This operation creates a sync document, and the sync document tracks the current signature or goal state of every file in each of these libraries using an entry that corresponds to every file, and updates the goal states as library files or items change in these respective libraries. Using this example, the sync document tracks the current goal state of LIBRARY_X and LIBRARY_Y, and if either file is not in the correct goal state, then work is created and assigned by the platform to put LIBRARY_X and LIBRARY_Y in the correct (same) goal state. In this example, the goal state is determined by the last or most current state, and the documents of LIBRARY_Y are the most current file versions so work is assigned to AGENT_X to update the files of LIBRARY_X to the same state as the files of LIBRARY_Y. The system then initiates a session involving the appropriate entities (e.g., peer agent(s), remote storage device(s), etc.) so that the necessary information can be retrieved to exchange data and synchronize the libraries.

Figure 5:
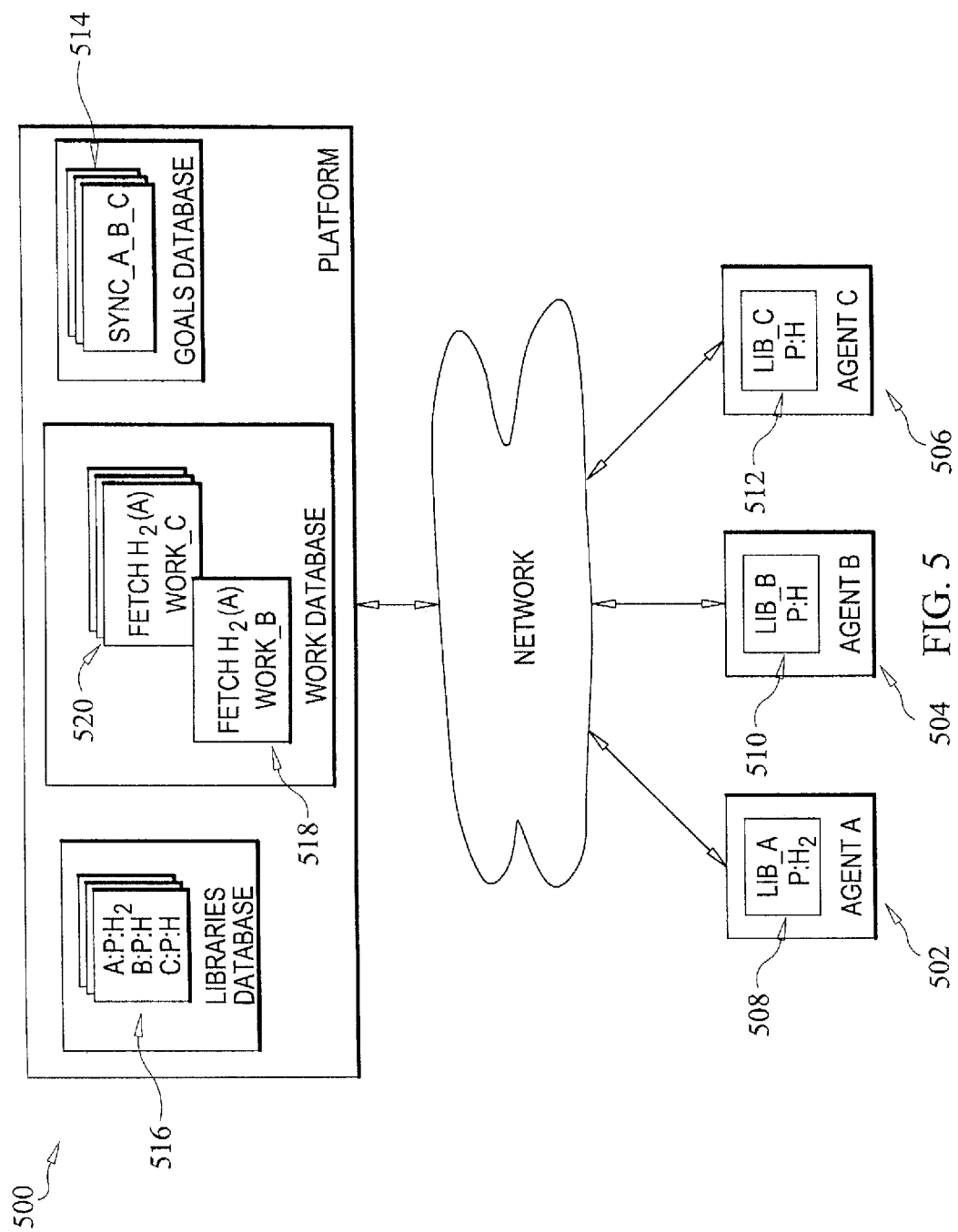
FIG. 5 is a block diagram of an example involving file synchronization between the platform and agents, under an embodiment.

Another example involving file synchronization between agents is depicted in FIG. 5 which shows a block diagram of an example involving file synchronization between the platform and agents, under an embodiment. This example includes three agents A 502, B 504, and C 506, and each agent has a corresponding library LIB_A 508, LIB_B 510, and LIB_C 512, but the embodiment is not so limited. The platform includes a goal 514 in the goals database to synchronize these three libraries. The platform includes a libraries database that comprises numerous records 516, each of which corresponds to a single file managed by the platform. Each record includes information in the form of an entry for each instance of the file, and the entry includes information of the library that includes the file and a hash of the file path (P).

Assume for purposes of this example that agent A reports for a particular file a different hash (e.g., H2) than agents B and C (e.g., H). The platform determines from information of the libraries database that agent A is reporting different hash information for the file than that of agents B and C and that the file of agent A is the most current version of the file. In response, the platform generates work for agents B 518 and C 520 (e.g., WORK_B and WORK_C, respectively) to update their files to the most current version that is possessed by agent A. The work generated is to locate and fetch the corresponding file and use the retrieved information to update their files, and the work task is placed by the platform into a work database of the platform. The work task generated by the platform of an embodiment includes information of a location (e.g., agent A) in the system where the most current version of the file is stored, but is not so limited. The work task includes information to fetch the corresponding file from the appropriate location(s) (e.g., one or more agents controlling blobs of the file) and use the retrieved information to update files. The work task is placed by the platform into a work database of the platform.

In this example, agents B and C retrieve their respective work (e.g., WORK_B and WORK_C, respectively) from the work database of the platform. Upon completing the work, each of agents A, B, and C include the most current version of the file, as indicated by the hash H2 in the libraries of agents A, B, and C (not shown). Further, each of the agents B and C report completion of the work task to the platform.

Figure 6:
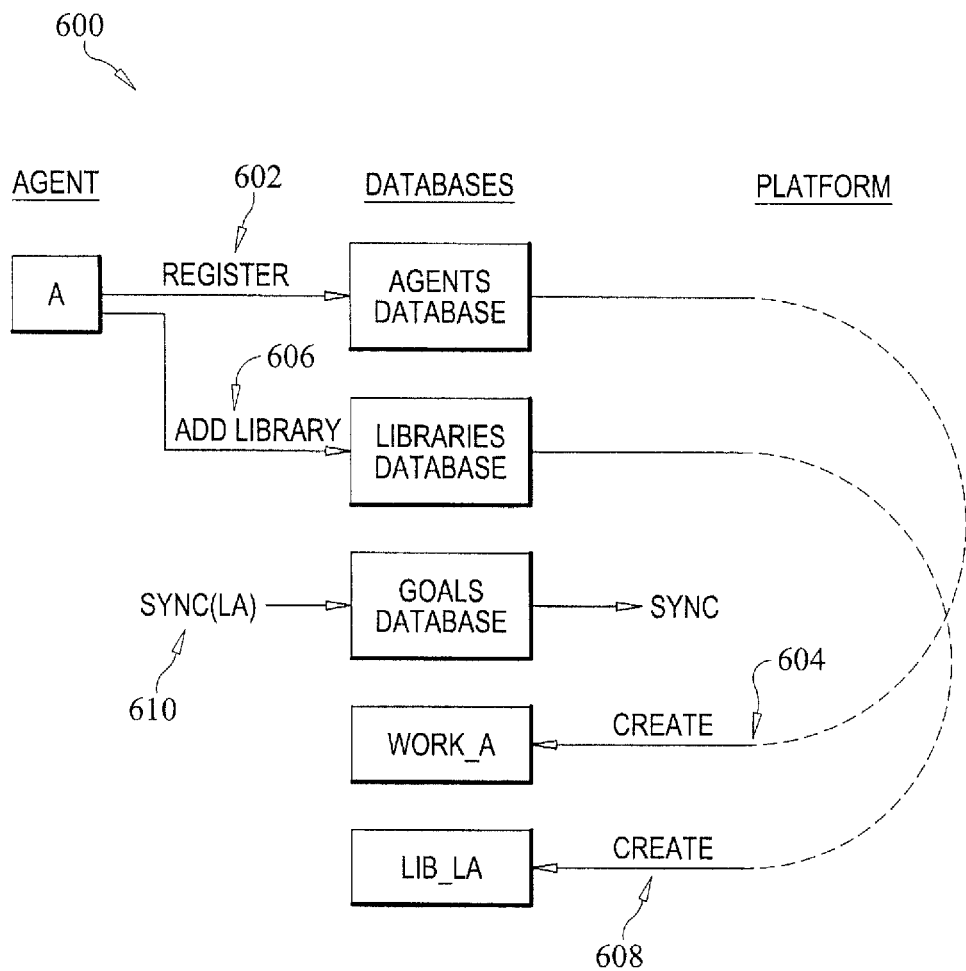
FIG. 6 is an example flow diagram involving an agent, the platform, and databases, under an embodiment.

More particularly, FIG. 6 is an example flow diagram involving an agent, the platform, and databases, under an embodiment. In this example, a new agent A registers 602 with the platform and an entry is created in the agent database corresponding to the new agent A. The platform in response to agent A being added to the agent database creates 604 a work database WORK_A for the new agent A. The work database WORK_A is generated to include work or tasks for the corresponding agent A. Additionally, a new library entry is added 606 to the libraries database corresponding to the new agent A and, in response, a new database LIB_LA 608 is created for information of the library of agent A. Further, a new sync goal SYNC(LA) 610 is generated and added to the goals database, and the new sync goal comprises information by which the platform directs synchronization among the files of new agent A and the files of other agents to which the platform has access.

Figure 7:
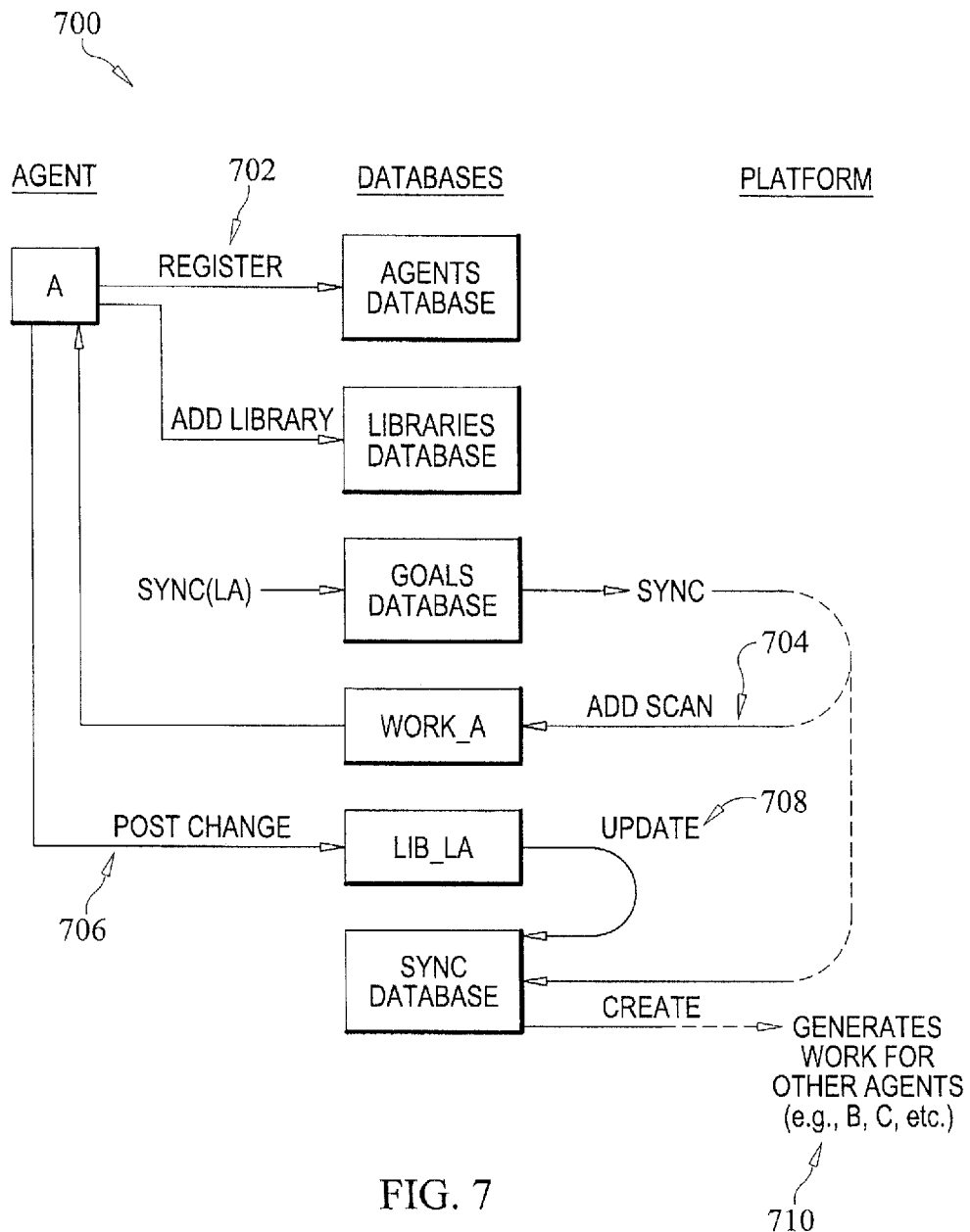
FIG. 7 is an example flow diagram involving use of a sync goal to scan and sync a library, under an embodiment.

In response to registration of the new agent A, the platform initially requires information of the contents of library A, and subsequently requires knowledge of any changes to the contents of library A. FIG. 7 is an example flow diagram involving use of a sync goal to scan and sync a library, under an embodiment. Following the registration process of agent A 702, the sync goal SYNC(LA) operates to create and add a work task 704 to the work database WORK_A of agent A. Agent A responds to the work task by scanning the contents of library A in order to determine or learn the initial contents of the library, as described in detail herein. In addition to passing to the platform the metadata of all contents of the library A, the information of the contents of library A is subsequently used to determine when changes occur to the contents of library A.

Using the information of the contents of library A, agent A subsequently monitors the library A for any change to content. The change can include the addition of a new file, deletion of a file, any change to content of any file, and renaming of a file to name a few, but is not so limited. Agent A, in response to detecting a change to the contents of library A, posts a change 706 into the library database LIB_LA. Further, agent A passes to the platform the metadata corresponding to any subsequent changes in the contents of the library A.

The platform of an embodiment includes a sync database. The platform generates the sync database to include and maintain a record of agents and file states and, more particularly, include an entry for each file and/or each agent that includes a content hash corresponding to that file and/or agent. When the platform detects the posting of a change in the database library LIB_LA, the platform updates 708 the sync database to reflect that change in library A. This change to library A means that other libraries (e.g., B and C) are no longer in sync with library A. As a result, the platform generates work for the agents 710 of the other libraries to update the libraries to be in sync with the contents of library A. Therefore, in this example, work tasks are generated for agents B and C to synchronize their libraries.

As another example, the platform and agents of an embodiment form a virtual NAS. So, instead of storing all data at a network storage device, which requires the data to be transferred to the device, the platform and agents can be used to generate a virtual NAS using the index of the data and the corresponding metadata of the platform. In this manner, the NAS is formed using the collection of computing devices that form the grid and is therefore on site and controlled by the owning agency.

As an example, a small office environment includes a Network-Attached Storage (NAS) device for use in backing up all computers in the office. After some period of time, however, the data of the office computers consumes all memory of the NAS device and additional storage is needed to back up the computers of the network. Using conventional technology, a first NAS would be required to be replaced with a NAS having a larger memory, or each computer in the office would be required to be assigned to a NAS so that all computers are not backed up on the same NAS. Use of the platform of an embodiment, however, eliminates this problem because the platform can be used to communicate with agents hosted on each of the memory devices or, alternatively, hosted on each computer in the office, where each agent has the ability to write to each NAS. In so doing, the platform communicates with all members of the grid that is formed through the agents, and by virtue of the communication the platform has information of the location of all data of the office. Using the metadata of the office data, the platform can direct each agent as to a location to which that agent is to store back up data or to a location to which that agent is to go to retrieve or read data needed by that agent to complete processing operations.

As another example application involving the platform of an embodiment, a user places digital pictures into a folder, and subsequently wishes to tweet all of the pictures contained in the folder using the Twitter application. In an embodiment, an agent is installed on a twitter API, and the platform includes a goal that every picture placed into the folder is provided to twitter. Using this goal, the platform directs that agent to provide the picture to twitter, and the twitter agent can then be directed to generate a tweet using the photos. As yet another example, the twitter agent can be directed by the platform to store every tweet received in an account at a particular location on a NAS.

As yet another example, the platform of an embodiment provides content transcoding and streaming instead of file transfer. Under this scenario, a relatively large file that is to be downloaded to a device can be transcoded and streamed to the device from one or more peer agents instead of downloading the complete file to the device.

To help businesses safeguard sensitive data, the platform of an embodiment includes a software-as-a service (SaaS)-based data synchronization and content management platform that provides visibility, analytics, management and security for business content across mobile devices, desktops and public, private or local clouds, as described in detail herein. The platform includes a cloud-based distributed data system that can locate, track and manage content across devices, users and geographies. The platform is configured to combine the strengths of peer-to-peer (P2P) systems with the centralization and control of more traditional cloud data storage platforms. This novel hybrid approach delivers uncompromising control and security.

The platform of an embodiment is differentiated from other cloud-based synchronization and content management platforms as a result of its cloud-based policy engine, agnostic file storage environment, highly efficient data transfer, automated data-discovery and segmentation, and multi-layered enterprise grade security. In a conventional cloud services environment, the majority of platform intelligence is hosted on mobile and desktop clients while the cloud acts as "dumb storage". The platform of an embodiment takes a more flexible, powerful and secure approach. Instead of "smart clients" accessing "dumb storage", the platform has a "smart cloud" directing "dumb clients". With this approach, the platform issues commands to the clients (mobile and desktop devices), improving functionality and security.

Figure 8:
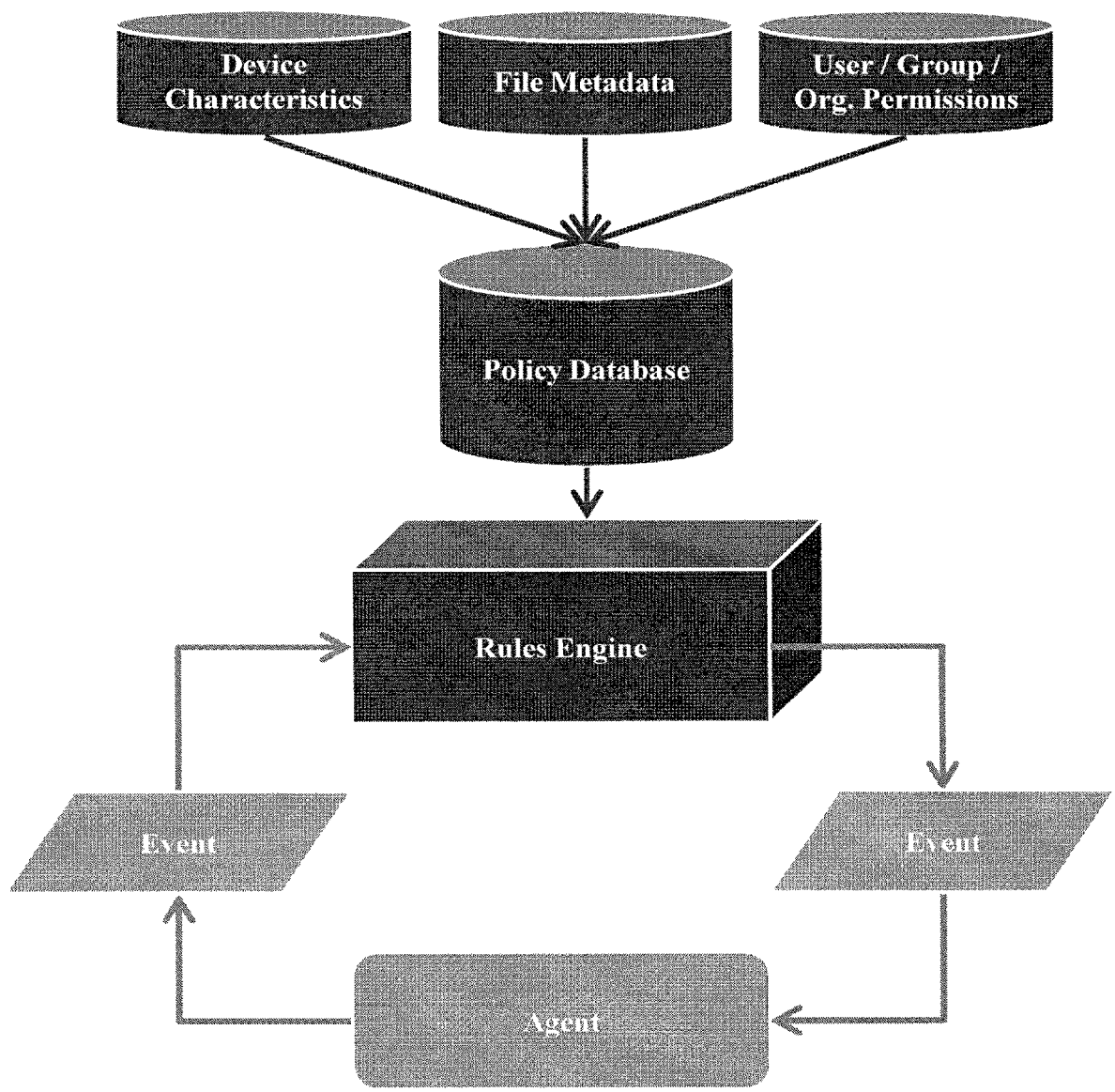
FIG. 8 is a block diagram of the platform including the policy database and rules engine, under an embodiment.

FIG. 8 is a block diagram of the platform including the policy database and rules engine, under an embodiment. The platform includes all of the service policies at the cloud level in a policy database, and the policy database is coupled to the platform rules engine. For example, a policy may be "copy any new files in folder X to the devices of user A, B and C". In addition to the policies of the policy database, the platform maintains a complete database of file metadata, users, devices, groups and organizations, giving the platform a complete understanding of the environment. A configuration of the platform includes the policy database coupled to receive device characteristics, file metadata, and permissions (e.g., user permissions, group permissions, organization permissions, etc.).

At the client level, local agents (i) monitor events (e.g., new file added to folder X), (ii) perform indexing of files (a file contains the following key terms), (iii) upload file metadata, device status and new events to the platform and (iv) process work issued from the platform (e.g., move data, scan folders, create files, connect to peer, etc.). The agent reports each piece of data that moves around the network to the policy engine in the cloud, enabling the platform to know where the data is located and where it needs to be located.

When a new policy is added or new events occur at the agent level, the platform acts as a director or "traffic cop" to determine what action should be taken. Based on the policy engine the platform issues commands to the local agent(s) to perform their tasks. The agent(s) only performs the work that it is issued from the policy engine. This approach enables abstraction of other critical components of the service to be easily achieved, and rapid iteration of new use cases (e.g., data backup, information governance) due to the intelligence residing in the cloud, and an improved security model where metadata is separated from file data.

Conventional cloud service providers force customers to upload and store data in their cloud infrastructure as the file storage access point. These providers benefit from this architecture by charging customers for the storage and by combining all user data in a single storage system, which allows the service provider to de-duplicate content and charge for storage that isn't actually being used. There are a number of security problems with this approach including, companies cannot choose their storage location and thereby lose control over their data, companies must trust their service provider to de-duplicate data correctly and not commingle their sensitive business content with other users on the system, and companies must share their encryption keys with the service provider to use features such as sharing, further exposing data to a potential breach.

Figure 9:
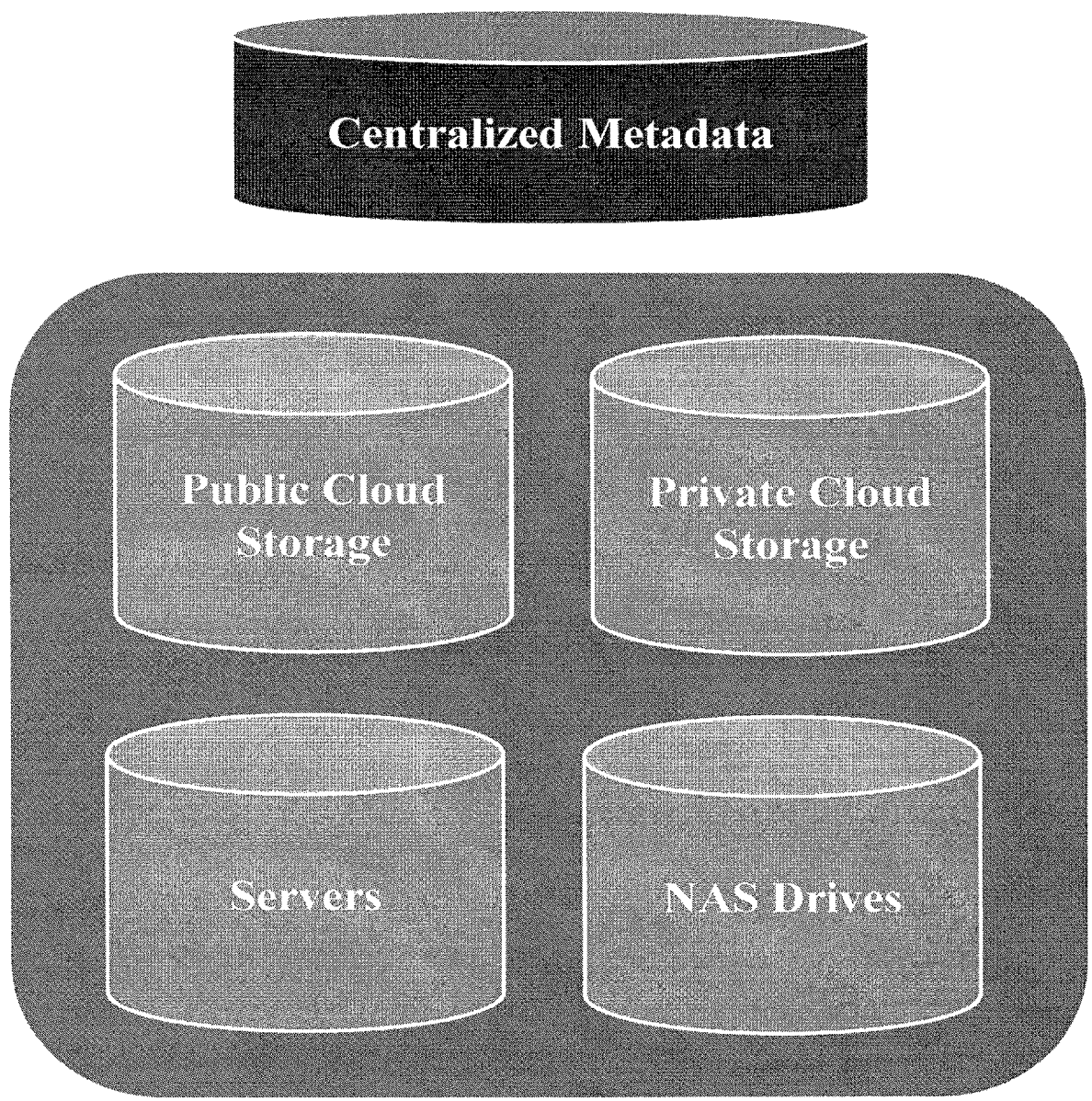
FIG. 9 is a block diagram showing metadata separated from other platform components, under an embodiment.

Contrary to conventional cloud services, the platform of an embodiment uses a variety of public, private and local clouds as the file storage access point. To deliver this agnostic file storage access point, the platform separates the file content from the metadata and treats the two very differently. FIG. 9 is a block diagram showing metadata separated from other platform components, under an embodiment. More specifically, metadata is centralized and stored in the cloud with corresponding servers while the actual file or file data is stored on one or more storage access points, as determined by the customer. In addition, advanced data fingerprinting and hashing controlled by the platform allows for file data to be securely stored across multiple data stores. Under this approach customers can choose the location where files are stored, which improves security, leverages existing infrastructure, enforces policies to store data locally and meets Safe Harbor requirements.

Conventional cloud service providers generally perform an inefficient two-step process for data transfers by uploading all data from clients into their centralized cloud and then back down to connected clients. Depending on the level of data de-duplication, hashing and P2P capabilities, this data transfer process can be time consuming and generate significant data transfer costs.

In contrast, the platform of an embodiment employs a series of technologies to transfer data. For example, the platform of an embodiment performs block level file transfers by moving blocks of data instead of entire files. As an example, if a 1 GB file is modified, the hashed block of the modified file (e.g., a 10 MB block) is transferred as opposed to the entire 1 GB file.

The platform includes data store indexes, which index data blocks across the entire system, allowing it to transfer data blocks from the closet point to the agent requesting the data. For example, if a file has already been uploaded to the cloud from one agent, the requesting agent downloads it directly from the cloud instead of requesting the originating agent to re-upload the file to the cloud for download.

Figure 10:
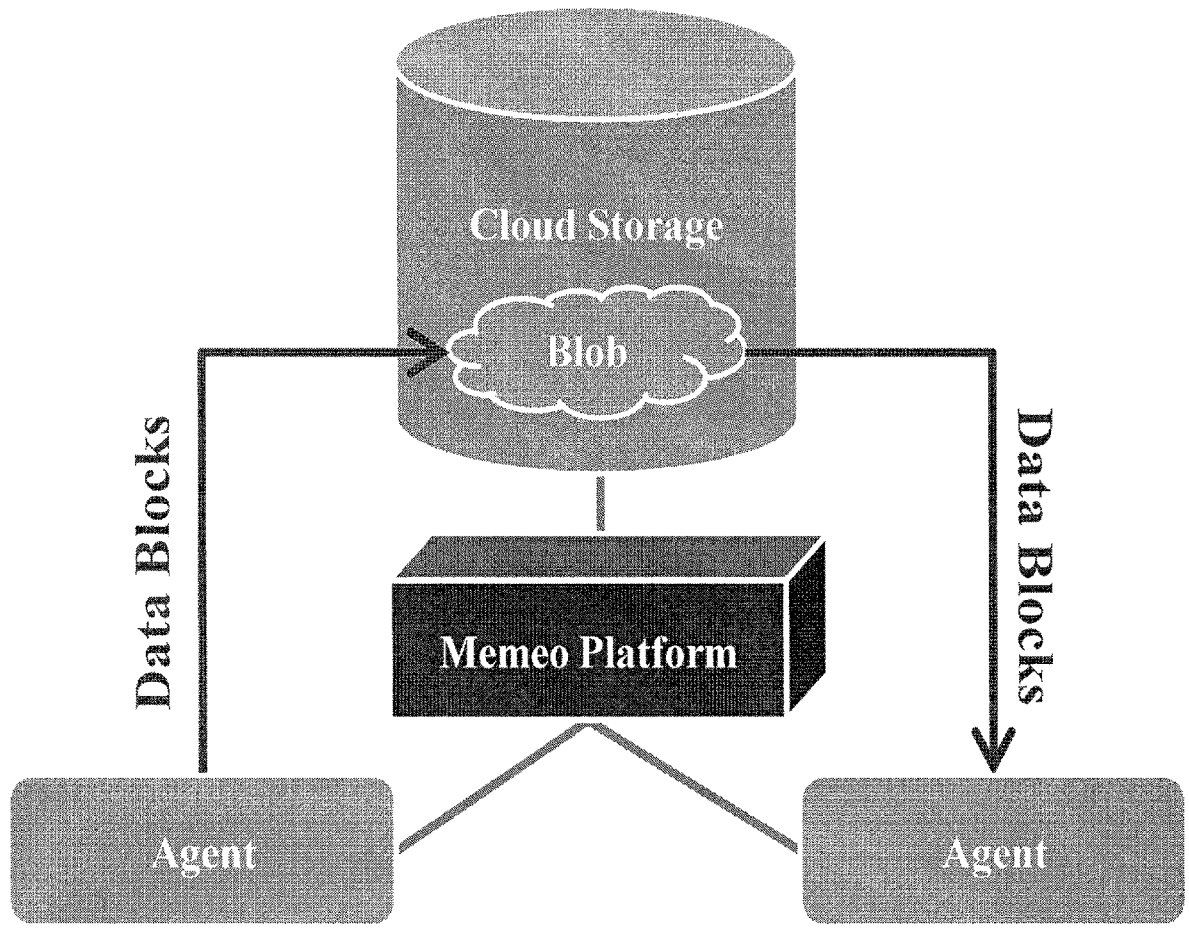
FIG. 10 shows connection types of the platform, under an embodiment.
Figure 11:
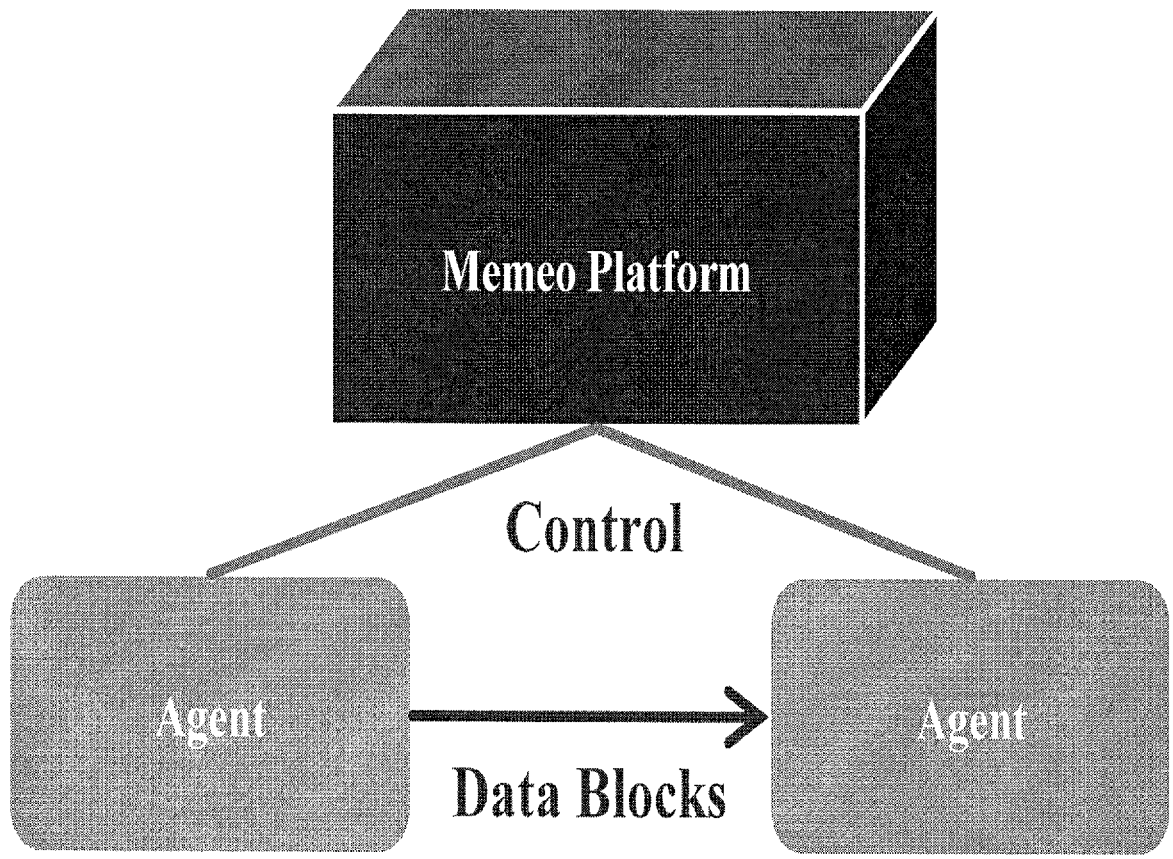
FIG. 11 shows the P2P connection types of the platform, under an embodiment.

FIG. 10 shows connection types of the platform, under an embodiment. The platform of an embodiment uses two connection types. The first connection type comprises HTTP/TLS between various local components and online servers and services. This is equivalent to a web browser and has the same firewall behavior as a browser on the same machine. The second connection type of an embodiment is a peer-to-peer (P2P) protocol. FIG. 11 shows the P2P connection types of the platform, under an embodiment. The platform takes advantage of P2P communication to efficiently move data between agents. For example, two agents on the same LAN can move data much more efficiently directly than they can through a cloud storage provider.

The platform of an embodiment uses the User Datagram Protocol ("UDP") to communicate P2P, but is not so limited. Using information from the service, the agents will attempt to establish a UDP session between each other. If both agents are behind the same firewall, this is successful. For peers outside the firewall, communication is more complicated. Some enterprise firewalls will not permit this traffic and, in these cases, the platform will "relay" data between peers via HTTP/TLS.

The platform performs co-operative file transfers where multiple agents can pool their upstream bandwidth to move a large file in pieces faster than any single agent could do alone. This technique is used both for cloud storage relay and P2P data transfer, but is not so limited.

The platform of an embodiment performs non-sequential/simultaneous transfers in which out-of-order data transfers are supported with simultaneous file upload and download. Using this method, data is reassembled at the agent once all blocks of data arrive, regardless of the sequence in which they were transferred.

Providers of conventional cloud services offer minimal data visibility within their platforms. Users may have access to their files, but information technology (IT) administrators have little to no visibility into the data within the system. Some service providers allow IT administrators to see a listing of file names across a system, while others do not provide any detail on the files in the system whatsoever.

The platform of an embodiment not only provides IT administrators a complete listing of an organization's files in the system, but also analyzes the content of each file to determine how sensitive or confidential each document may be. To accomplish this the platform performs a two-step process, first delineating between personal and business content and then determining the sensitivity of the identified business data.

To delineate between personal and business content, agents scan documents across a local data store and extract key terms from those documents. These key terms are then compared across an entire organization to generate a list of company specific key terms. Using this set of organizational key terms and other proprietary methodologies, the platform separates business and personal data across the local store, enabling IT administrators to focus solely on managing company data.

To determine the sensitivity of business data, the platform searches for the presence of specific key terms (e.g., "Company Confidential"), analyzes the specific syntax of data (e.g., credit card numbers, e-mail addresses, phone numbers, etc.) and performs other proprietary analysis. This segmentation allows IT administrators to identify the most sensitive content within a business. Once a document's sensitivity becomes part of the metadata, the platform allows IT administrators to enact specific controls over the data, limiting where and how it can be accessed and shared.

Automated data-discovery and segmentation of content further allows IT administrators to identify sensitive business content without relying on end user tagging or categorization, locate critical content without having to sift through personal or non-critical business files, and create specific controls to safeguard sensitive content.

In conventional cloud service platforms, each individual's user data is stored together and de-duplicated across the entire data set (e.g., data of all users stored with the cloud service provider). This commingling approach can lead to potential data leakage if files are not indexed correctly.

The platform of an embodiment is configured to manage data in a controlled and secure fashion around a framework that provides security at the access, application, infrastructure, network, transmission and data level. This approach allows data from each user and organization to be managed in a "security silo", with its own unique set of security information as described in detail herein.

The platform provides to each organization unique organizational encryption keys that are used to encrypt data in shared storage or in the cloud. In addition, all hashes computed on data are salted with a value unique to the organization. No two organizations will ever share the same hash, even if the underlying data is identical. This prevents the platform from de-duplicating data between customers, a security weakness, while allowing data de-duplication at the organization level, which saves storage space and minimizes unnecessary data transfers. In the event that an unauthorized user accessed the backend service or data store, that user would be limited to seeing only unusable encrypted blocks.

The platform is configured to facilitate file sharing among authorized parties. All authorized agents and clients are able to access and contribute to the organization's data seamlessly. As the data is not encrypted at the user level, it belongs to the organization. When a new user is added to the organization, the new user receives the keys required to create and access the data for that organization, allowing them to interoperate with other users. Data created by the user is available to other users within the organization even after that user leaves the company.

The organization's encryption keys are generated by the platform when the account is provisioned and are then encrypted using the passwords from the organization's IT administrators and users. The keys cannot be accessed without the user or administrator's password, which are never stored by the platform. It is not possible for the platform to decrypt customer data unless that user is in an active session and has provided his or her credentials, and there are no master keys. However, the platform does store a recovery key that can be used to apply a new password to an account should one become lost.

Device level data is stored on its local file system and the platform does not encrypt or encode local device file system data, but it is not so limited. However, any data or metadata that leaves the device is encrypted using SSL (from device to web), end-to-end encryption (from device to device) or at-rest encryption (device to cloud or shared storage).

Each agent on a device has two 2048-bit RSA public/private key pairs in an embodiment. One is used to secure end-to-end encryption and the other to sign messages and validate message sources. These keys are pre-generated and assigned by the platform but are not stored in the cloud once they have been assigned. Keys and certificates are always stored in the secure key stores provided by the operating system. Unlike conventional P2P, there are no "anonymous peers" in the platform; each and every connection between agents happens because the central cloud has determined it is the most efficient path between them. The identity of the source and destination of data transfer is known in advance of the connection and independently verified by every agent. Agents cannot accept connections that they did not expect.

When agents couple or connect to each other to exchange data, they use public key cryptography to provide end-to-end encryption of all data sent between them. The platform keeps the public keys for all agents and gives them to both ends of any P2P request. The platform does not keep private keys, which are kept only at the agent level, but the embodiment is not so limited. The agents use these private keys to securely establish a symmetric encryption key that is used to encrypt the data between peers using the government-grade AES-256 algorithm. This ensures that unauthorized users cannot interpret the content of messages sent between peers. The sessions between agents are temporary and when they expire, a new connection must be set up, which requires a new key to be exchanged.

SSL is the widely accepted standard for secure communications to and from web servers. Whenever the client or a browser is connected to the platform, it utilizes SSL to secure the traffic. Metadata and agent instructions are also secured in this manner.

The platform ensures that all data is at-rest, in the cloud or on shared storage devices, is encrypted. When agents are asked to store data, they use the organization encryption keys to encrypt the data. Only authorized agents can decrypt data that is stored in this manner. At-rest data is also encrypted using the AES-256 algorithm.

The separation of data and metadata of an embodiment provides additional security and complete control, while minimizing expense. All data is hashed and encrypted with keys unique to that customer and metadata is stored separate from the data.

The platform provides an easy way to access, update and share critical business data across mobile devices, desktops and the web. Users can access files across iOS and Android smartphones and tablets, Windows and Apple computers and web browsers. Files modified on one device are automatically synced to all other authorized and connected devices. The user can also share files with co-workers or individuals outside of the organization via bi-directional shared folders or one-way web links.

More particularly, the platform of an embodiment provides backup and recovery that protects the data, applications, and operating systems across a variety of environments (e.g., desktops, mobile devices, servers, cloud services, etc.). This allows the user to monitor installed backup applications, integrate key backup metrics into management code, and alerts the user for sensitive files at risk.

The platform ensures all sensitive documents are included in a backup plan and verifies that those documents are currently backed up. The administrator is alerted if any sensitive document is not protected within a period of time, and identifies the location of sensitive documents across the organization. The platform also restores from an alternative location if the backup fails, and ensures that sensitive documents are backed up in multiple places by way of duplication across users or in duplicate backup locations. The backup of files is deleted in accordance to specific retention policies and ensures that sensitive documents are backed up to a more secure storage location offsite. In addition, the platform provides backup services that allow for remote configuration and deployment of a backup operation.

Backup and recovery provided by the platform comprises file source backups of desktops, servers, shared storage, mobile devices and online storage to name a few. File types involved in backup and recovery operations include data files (e.g., documents, video, music, images, etc.) and application specific files (e.g., Outlook, PST, MS Exchange, databases, etc.). File selection selects files to back up based on file type and/or folder location, or alternatively performs a backup of an entire drive or computer system (e.g., system image). File storage stores selected files on an external hard drive, NAS or online, or chooses multiple locations for redundancy. Automatic or scheduled backup automatically adds any new or changed files to the backup wherever the storage device is detected, and also schedules backups based on a schedule.

File recovery of an embodiment is configured to easily restore selected files or fully restore all files if the computer crashes, or if files are inadvertently deleted. Data loss prevention prevents data loss by monitoring data while in-use (e.g., endpoint actions), in-motion (e.g., network traffic), and at-rest (e.g., data storage). File-level DLP software identifies the sensitive files and then embeds the information security policy within the file. Anytime, anywhere access of the platform provides access to all files and folders at any time online via a user console. Version history stores previous versions of files and allows the user to revert to those versions. Deleted files are stored for a period of time to allow users to restore deleted files if deletion was accidental. File systems and unstructured content is archived based on corporate policies to reduce costs and mitigate risk.

The platform of an embodiment provides file sharing and access, which allows the user to access and share files and other content across a variety of environments (e.g., computers, mobile devices, servers, cloud services, etc.) and the web. Files can be shared via bi-directional folder sharing and web link sharing, and key metrics and controls can be integrated into management console.

The platform restricts or controls sensitive documents by preventing sharing with certain users, groups or outside of a company. Sensitive documents cannot be accessed and/or downloaded to mobile devices via the platform, rather, they can only be viewed online so as to maintain control, and document downloads are limited to temporary copies only, to be removed when they are not connected. Files cannot be copied outside of the platform-associated folder or to external storage devices or locations. Additionally, files cannot be e-mailed as an attachment, sent via text electronic messaging, or uploaded to social media. An embodiment includes an exceptions process to grant one-off requests. Detailed reporting on location of documents, who has access to documents and revision and access history is also available.

File sharing and access of the platform of an embodiment offers content management that creates, manages, edits and stores files across devices and systems. Synchronization of an embodiment selects files to be synchronized across devices in order to make them available from any device. Changes are also automatically synchronized. Anytime, anywhere access allows access to any file from any device (e.g., desktop, laptop, phone, tablet, online, etc.). Shared folders give access to a folder where internal and sometimes external users can view and edit files contained within the folder and have changes synced to all users. More granular permissions are included (e.g., manager, editor, viewer, etc.) but the embodiment is not so limited.

The platform includes public links by which files can be shared via a link that can be accessed by anyone including non-users. Files are read-only in order to prevent editing, but users can view files, and downloading is sometimes restricted. External document management and security controls what happens to files after they are shared externally by locking files so they cannot be printed or edited. Collaboration auditing provides comprehensive audit and tracking tools to give a better view of content sharing and file download activities. The user can see who has not downloaded relevant files. Large file delivery provides an alternative method to email for sending large files online such as sharing public links. Email integration allows the user to email any file directly from any device by right-clicking the file or selecting an email option. Mobile previewing allows the user to view any file on any mobile device. Mobile document editing provides the ability to edit files on mobile devices. Mobile printing allows the user to print any file on any mobile device by designating a default remote printer. Mobile scanning allows the user to scan an image or paper document from a mobile device to access across devices. Quarantining system uses antivirus capabilities to isolate infected files from the hosting system. Regulatory compliance takes steps to comply with SOX, HIPPA, PII, PCI, FINRA, FDIC, SAS70, Basel II, Dodd-Frank, and FCPA to name a few.

The platform of an embodiment provides collaboration that includes simultaneous editing of documents (e.g., word processing, spreadsheets, presentations, project plans, etc.) across a variety of environments (e.g., desktops, mobile devices, servers, cloud services, etc.). File-in-use alerts for shared documents, notifications for modified documents, and revision and access history are available. As such, the platform provides a user with notifications if a document is in use to prevent collisions, locks a user out if the document is in use, sends an alert when someone edits or adds content to a shared folder or file, and notifies the user of released documents. The platform forces online collaboration only via simultaneous editing and provides revision reconciliation and merging tools, revision and access history, check-in/check-out systems, and office integration.

Collaboration of an embodiment offers many key features. Multiple people can view and edit the same file. Permissions grant granular sharing rights for multiple people to edit the same file (e.g., manager, editor, viewer). Collaboration auditing provides comprehensive audit and tracking tools to give a better view of content sharing and file download activities. The user can see who has and has not downloaded relevant files. Activity history tracks all file activity such as when file changes were made and by whom. Email notifications send an alert when someone edits or adds content to a shared folder or file. Commenting allows for comments on files and/or discussion area to add feedback or discuss changes. Annotation adds notes to existing files for collaboration and discussion purposes. Business process management provides automation of business processes with the use of information technology to be more efficient, more effective and more capable of change. This includes items such as workflow or task management.

Workflow/task management assigns tasks and deadlines as part of a review process, and assigns file-specific tasks to ask for updates, reviews or approvals. Project management breaks goals down into milestones with individual deadlines to progress towards the ultimate goal, and assigns tasks based on the various milestones. Online document editing edits various file types online without having to first download them to the user's local computer. Mobile document editing edits files on mobile devices. Mobile previewing provides the ability to view any file on any mobile device. Mobile printing prints any file on any mobile device by designating a default remote printer. Mobile scanning scans an image or paper document from a mobile device to access across devices. It digitizes paper documents on the go.

The platform of an embodiment provides document management, which controls access to documents based on user privileges, document availability and document state. The document management of an embodiment integrates with thirty-party applications (e.g., Office) to maintain workflow, enables versioning and audit trails for documents, and enforces security requirements for documents. The platform therefore allows the user to index, track and catalog business files, and categorize file sensitivity, and the limited rights management gives file access to individuals or groups.

The platform assigns the user the rights to a file (e.g., manager, editor, viewer), and restricts sensitive documents in many ways. Files cannot be modified and are read-only for certain users, are destroyed after a period of time unless requested otherwise, and cannot be captured with image capturing software. File formats are converted (e.g., to PDF, etc.) before distribution (e.g., read-only) so that the contents of a document cannot be copied and pasted to another document. Additionally, files can only be stored on company servers and therefore cannot be stored on public clouds, and files and file derivatives are tracked across storage device(s). The platform also includes file and non-file based content (e.g., Wikis, Evernote, social media, etc.), and there is an exception process to grant one-off requests. The platform provides detailed reporting on location of documents, who has access to documents, and who has actually viewed documents and on what devices and what location. Revision and access history are also available via the platform.

The platform discovers confidential stored data using identifying business information. The platform extracts key words and compares extracted terms across the organization. The platform can identify business documents across multiple sources using one or more of document name, document size, proximity (e.g., 90% of documents within a folder are business; assume 100%), key word comparison, and hash comparisons to name a few.

The platform also categorizes sensitive data. Documents that are marked are manually tagged as sensitive. Examples of selected key terms include "Company Confidential", "Income Statement", "Partner Pipeline", "Password", and "Credit Card". Learned key terms are those key terms most prevalent in documents marked "Confidential." The platform makes inferences based on detected contents (e.g., 5 instances of company names, etc.). The platform also categorizes data based on syntax (e.g., "###-##-####", "3767-######-#####", aaaaaaaa@aaa.com, "####-###-####"). The platform records document attributes such as who is the owner, where is the file, what are the permissions, and who has access.

The platform also categorizes sensitive data that includes intellectual property, customer information, employee information, sales information, marketing information, and financial information, for example. Intellectual property includes proprietary engineering designs, scientific formulas, source code, trade secrets, and new (non-public) product information. Customer information includes names, email addresses, customer passwords, phone numbers, social security numbers, addresses, credit card numbers (last 4 digits), and dates of birth. Employee information includes social security numbers, birth dates, and addresses. Sales and marketing information includes customer lists, quotes, marketing and sales plans, material costs and profit margins, and project plans and spending plans. Financial information includes financial records and strategic business plans.

The document management included in the platform includes searching/indexing tracks, and searching and retrieving electronic documents by indexing unique document identifiers, metadata or through word indexes extracted from the document's contents. Rights management allows an administrator to give access to documents based on type to only certain people or groups of people.

Collaboration provided by the platform of an embodiment allows documents to be retrieved and modified or edited by an authorized user. Multiple users can view and modify a document at the same time in a collaboration session and the platform stores the markups done by each individual user during the collaboration session. However, access to other users should be blocked while a document is being revised or edited by a user. The platform also sends alerts and notifications for document availability, but is not so limited.

Versioning of the platform of an embodiment retrieves previous versions of a document and allows the user to continue to work from a selected point. Third party integration integrates with third party applications so that users may retrieve existing documents directly from the document management system repository, make changes, and save the changed document back to the repository as a new version, all without leaving the application. Publishing and distribution of a document via the platform includes proofreading, peer or public reviewing, authorizing, printing and approving. Security includes compliance requirements for certain documents, which can be relatively complex depending on the type of documents (e.g., SOX, HIPPA, PII, PCI, FINRA, FDIC, SAS70, Basel II, Dodd-Frank, FCPA, etc.). The platform includes granular capabilities such as controlling printing, copying and forwarding, as well as the ability to watermark or wipe the document. Workflow offers automatic routing of individual documents or binders with engagement management features such as scheduling, checklists, review note management and more. External document management and security controls how files are shared and integrates with other modules and third party systems.

The platform of an embodiment provides data intelligence and information governance, which identifies data (e.g., documents, Evernote, Wikis, etc.) across desktops, mobile devices, local storage, networked storage and cloud services. This data intelligence and information governance generates more informed decisions about the management, retention and disposition of business data, and identifies compliance violations and makes infrastructure planning decisions. The platform determines location, owners and usage analytics of business data, and includes limited information compliance (records retention, etc.) as well as limited information governance (e.g., SS numbers, credit cards, etc.).

The platform allows the user to determine the location of all sensitive files and understand certain information about the data. The user can also remove files from any unsecured location (e.g., mobile devices, public clouds, home computers). Select policies can be applied to file metadata (e.g., retention, expiration, access, etc.) for records retention, defensible deletion and compliance enforcement. A full document search can be performed across all data sources via file name, document key terms or full text search.

Data intelligence and information governance of the platform includes dimensional maps and business analytics or rules that determine how much data belongs to a user, where the data is located, who owns the data, where the data has been, age of the data, and how much data is relevant to the user's business. The platform gains visibility over content wherever it is hosted by providing file classification and searches on the contents, and it discovers compliance and regulatory violations, and uncovers aged, non-business related data. Information genealogy provides a security-relevant chronological set of records, and a destination and source of records that provides a sequence of activities. The platform tracks all file relationships and where they are located. Information governance provides policy management including records retention, defensible deletion and compliance enforcement, and protects business-critical information assets such as account numbers, social security numbers, credit card numbers, trade secrets, financial records, strategic business plans and IP/source code. Once exposed sensitive data has been identified, automated polices can modify the file's security attributes, move the data to a more secure system within the enterprise, or delete the item of risk.

Records management implemented by the platform implements and automates proactive, continuous records retention and disposition strategies. File share clean up allows the user to gain control of business data sprawl by understanding the user's environment. The platform categorizes data, updates data attributes, and assigns permissions. Intelligent e-discovery provides legal hold notifications, true early case assessment, and intelligent collections. Data deletion and cleanup of the platform leverages data topology maps and classifications to identify non-business data, and performs defensible data cleanup prior to information management initiatives such as storage/data migration, e-discovery, records management, or compliance mandates. Storage optimization optimizes the use of existing storage resources and reduces storage costs, and leverages data topology maps and classifications to monitor and plan for future storage need.

The platform of an embodiment provides mobile device management, which monitors and supports mobile devices, enabling organizations to enforce policies as well as control and protect data to maintain the desired level of IT control across multiple platforms and applications. The platform provides end-to-end security through centralized management of mobile devices via a single mobile device software product. The platform also includes GPS asset tracking, password compliance/SSO, remote lock/wiping, device usage tracking, such as tracking apps and data uploaded, viewed and edited, and device application management.

The platform allows the user to perform a remote wipe across all sources and remove original files and derivatives, remote lock, and detect and protect against jail-broken devices. There is password compliance with single sign-on and device configuration and monitoring for networks, e-mail configuration, and battery life. Application management limits applications and pushes mandatory applications, and includes application monitoring (e.g., data uploaded, viewed, etc.) and ensures all applications are up to date and functioning properly. The platform also includes GPS tracking and reporting/real time notifications of non-compliant devices.

Mobile device management of an embodiment comprises mobile risk management that provides real-time visibility to all mobile devices connecting to associated resources, and achieves balance between embracing employee choice (e.g., Bring Your Own Device) and protecting company data. Mobile security provides antivirus technology, advanced firewall, and anti-spam features. GPS asset tracking locates and tracks coordinates of mobile devices in a central console. Remote lock/wiping protects the user's device and its data in case of unauthorized access. Device inventory tracking of the platform tracks files and data uploaded, viewed and edited on the device, and provides greater visibility to the administrator through a search function to sort files (e.g., by classification, recently viewed/edited, etc.).

Device application management of the platform distributes applications based on group settings, restricts or allows designated public market apps, and pushes mandatory applications. The platform also alerts and disables access to non-compliant devices, manages private applications and delivers them to users without exposing them to the public application store. The platform also administers updates to devices. Security policy management of an embodiment includes push certificates, email server settings, restrictions, and camera settings for devices (e.g., Android devices, iOS devices, etc.). The platform lists processes running, applications installed, battery life, and network information. The user can get real-time notifications and alerts to administration for exceptions.

The platform generates user reports by completing an audit report of user activity (e.g., file uploads, file downloads, application usage, sharing activity, etc.). The platform manages mobile content sharing by pushing corporate documents and sensitive files to mobile devices in a secure manner with data loss prevention, and is configured to send remote updates to files and remove content without end-user intervention. Instant recovery and backup provides the ability to restore all files to a device at once if files are lost or corrupted. The platform remotely wipes devices, but it can also provision policies and applications to devices, black or whitelist applications, and detect and protect against jailbroken devices.

The platform of an embodiment provides resource utilization and security, which integrates contextual information and provides visibility into a variety of environments (e.g., mobile devices, desktops, servers, etc.) to monitor, optimize, and protect data, applications, and devices. The platform comprises application information tracking for hardware, software and application usage, resource consumption for storage, RAM and network monitoring, and optimizes storage, data cleanup, and archives.

Data deletion and cleanup of an embodiment leverages data topology maps and classifications to identify non-business data. The platform performs defensible data cleanup prior to information management initiatives such as storage/data migration, e-discovery, records management, or compliance mandates, and also archives stale data that needs to be retained. Storage optimization optimizes the use of existing storage resources and reduces storage costs (e.g., data de-duplication) and, further, leverages data topology maps and classifications to monitor and plan for future storage needs, and track resource consumption (e.g., storage, RAM, network monitoring).

Resource utilization and security of the platform includes application and information tracking that collects information on how hardware, software, and applications are being used. The user can track most utilized programs, websites, and file types. A resource consumption report shows how much RAM, bandwidth, and storage space the users are using. Context-aware software for optimization tracks and establishes patterns of different usage rates over time, thereby reducing unpredictability by increasing visibility into application usage and movement of data. The platform redirects valuable resources to key users, applications and/or programs. Improved visibility allows for planned and real-time allocation.

Platform client security provides antivirus technology, advanced firewall, and anti-malware. The platform activity security monitors and alerts administrators of abnormal activity on devices and/or clients. Cloud security of the platform includes policies, technologies, and controls that protect data and applications in the cloud. Deployment and imaging deploys and manages computers from a centralized location. Android code signing manages certificate keys and applications for easy application version updates in Google Play. Device configuration management distributes applications/software based on group settings, and restricts or allows designated applications/software and pushes mandatory programs. The platform alerts and disables access to non-compliant devices. The platform manages private applications/software and delivers them to users without external exposure, and also administers updates to devices. Endpoint security ensures the operating system, web browser, and other applications are up to date before permitting access.

Figure 12:
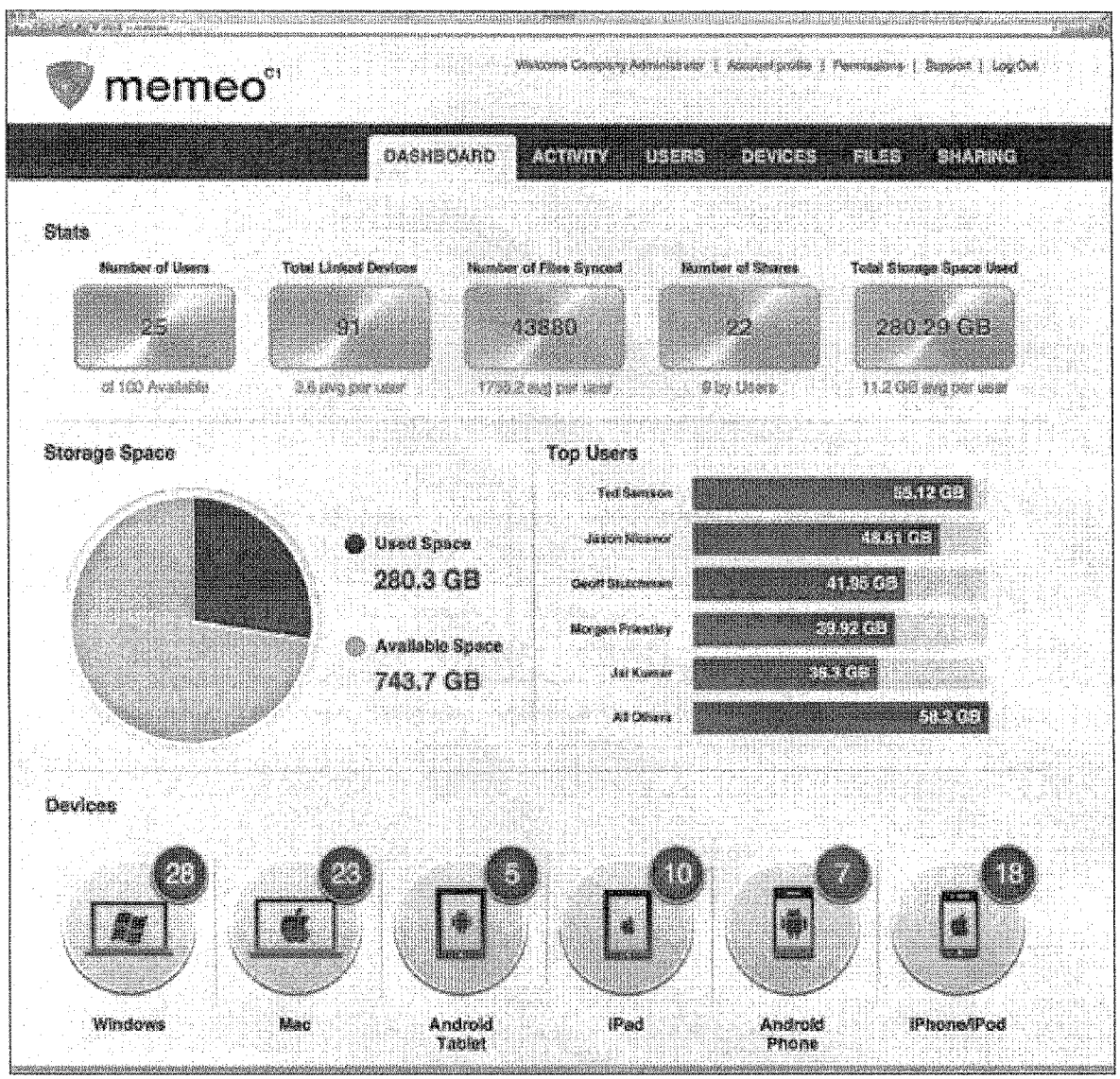
FIG. 12 shows an example screen of the management console, under an embodiment.

The platform of an embodiment includes a management console that gives IT administrators unparalleled visibility into and control over the way business data is accessed, viewed, modified and shared. FIG. 12 shows an example screen of the management console, under an embodiment. The online management console provides real-time visibility into all aspects of the service, including how active users are, what devices they have connected to the service, what files they are syncing and with whom they are sharing data. The management console also allows IT administrators to proactively manage critical features of the service including user permissions, file access restrictions, sharing controls and remote data wipe.

Figure 13:
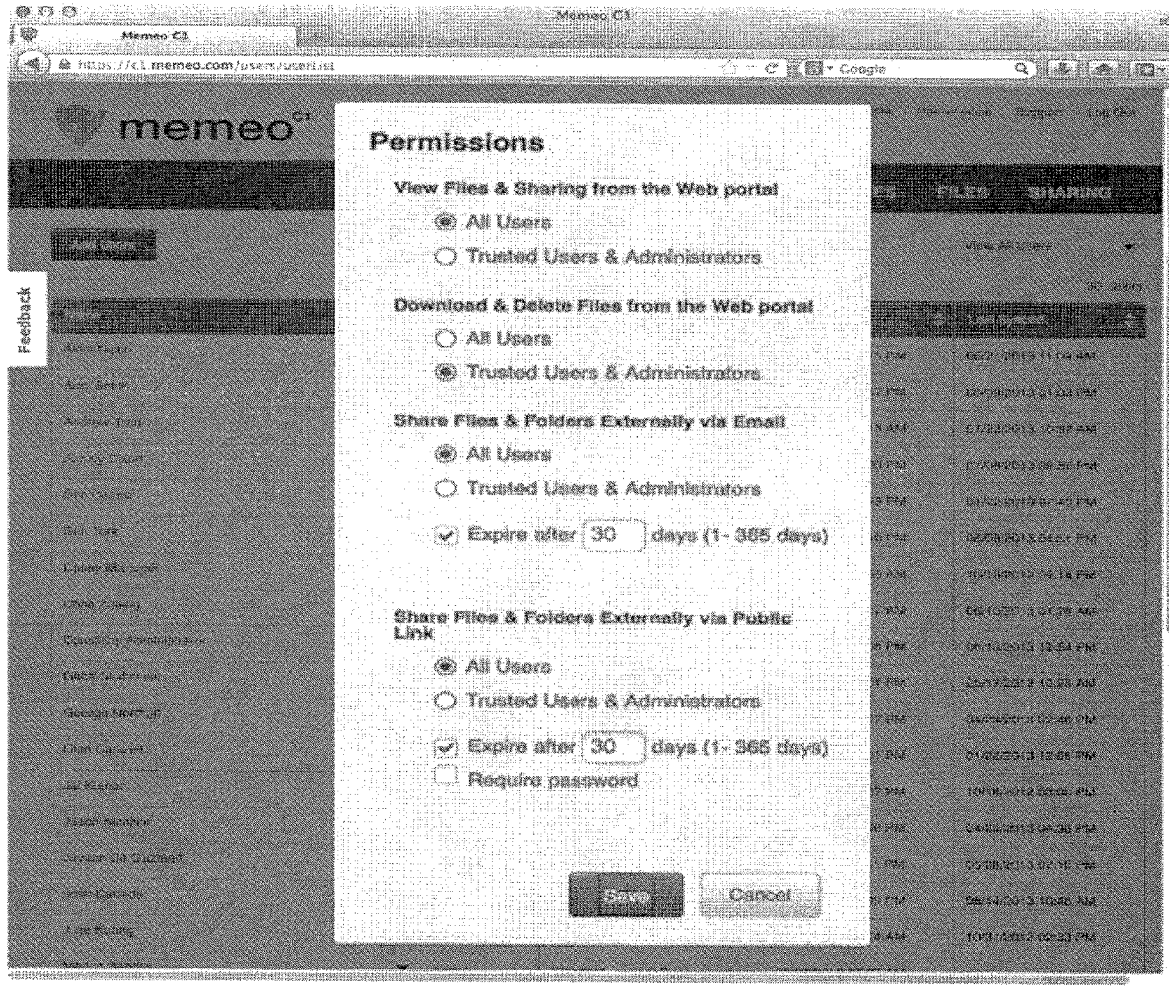
FIG. 13 shows an example screen including file synchronization controls, under an embodiment.

The management console includes the ability to control various aspects of the file synchronization process. Because the platform automatically identifies sensitive documents, IT administrators can restrict important business documents from being synchronized across the service or from being shared internally or externally. In addition, IT administrators can set a maximum size for files that can be synced to control storage and bandwidth consumption or designate which file categories (e.g., music and videos) are prohibited from residing on the network. IT administrators can also define whether files can be accessed and downloaded from the user web portal. FIG. 13 shows an example screen including file synchronization controls, under an embodiment.

Figure 14:
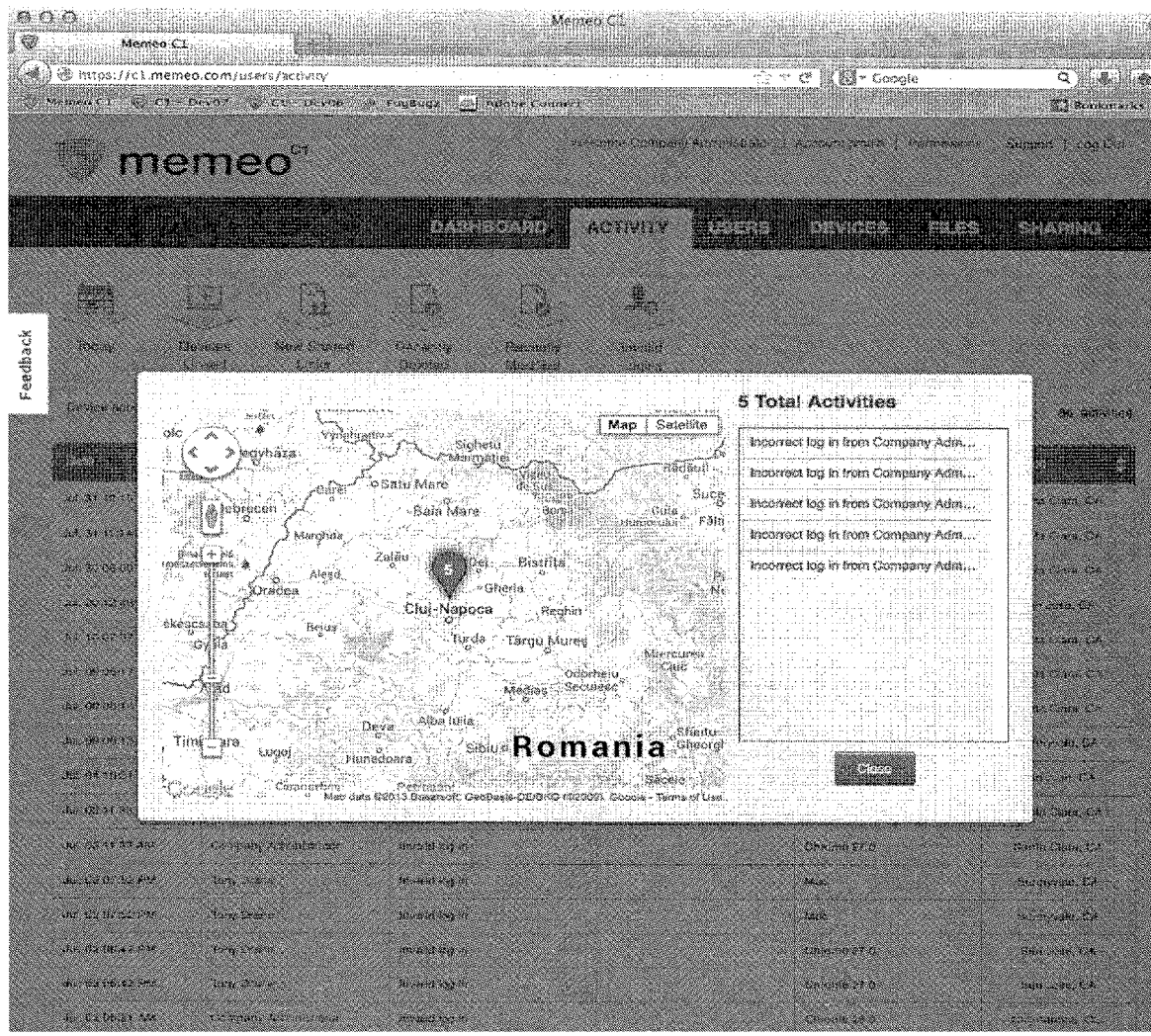
FIG. 14 shows an example screen including security activity monitoring and notification, under an embodiment.

The platform delivers real-time automated activity monitoring, auditing and reporting to IT administrators that details important system activity by date, time, user, device, file and other elements. To enforce security policies, IT administrators can view the number of invalid logins, password reset attempts, sensitive file sharing events and other activities. FIG. 14 shows an example screen including security activity monitoring and notification, under an embodiment. In this example, an IT administrator is alerted to a potential security issue because five invalid login attempts to the IT administrator's account have been made from an unknown location in Cluj, Romania. If a security event occurs within the system, IT administrators can receive alert notifications via the management console, IOS/Android apps, text or email to name a few.

FIG. 15 shows an example screen including document audit trails, under an embodiment. The platform records a complete file history of documents in the service. For each document, an IT administrator can view when a file was added, modified or deleted. In addition, IT administrators can determine which device accessed the document and the geographic location of that device. This functionality is essential for shared documents that are being modified by multiple users across several devices. In addition to compiling document audit trails, a complete revision history of each file is also stored in case the IT administrator or user wants to revert to a previous version of a file.

Figure 16:
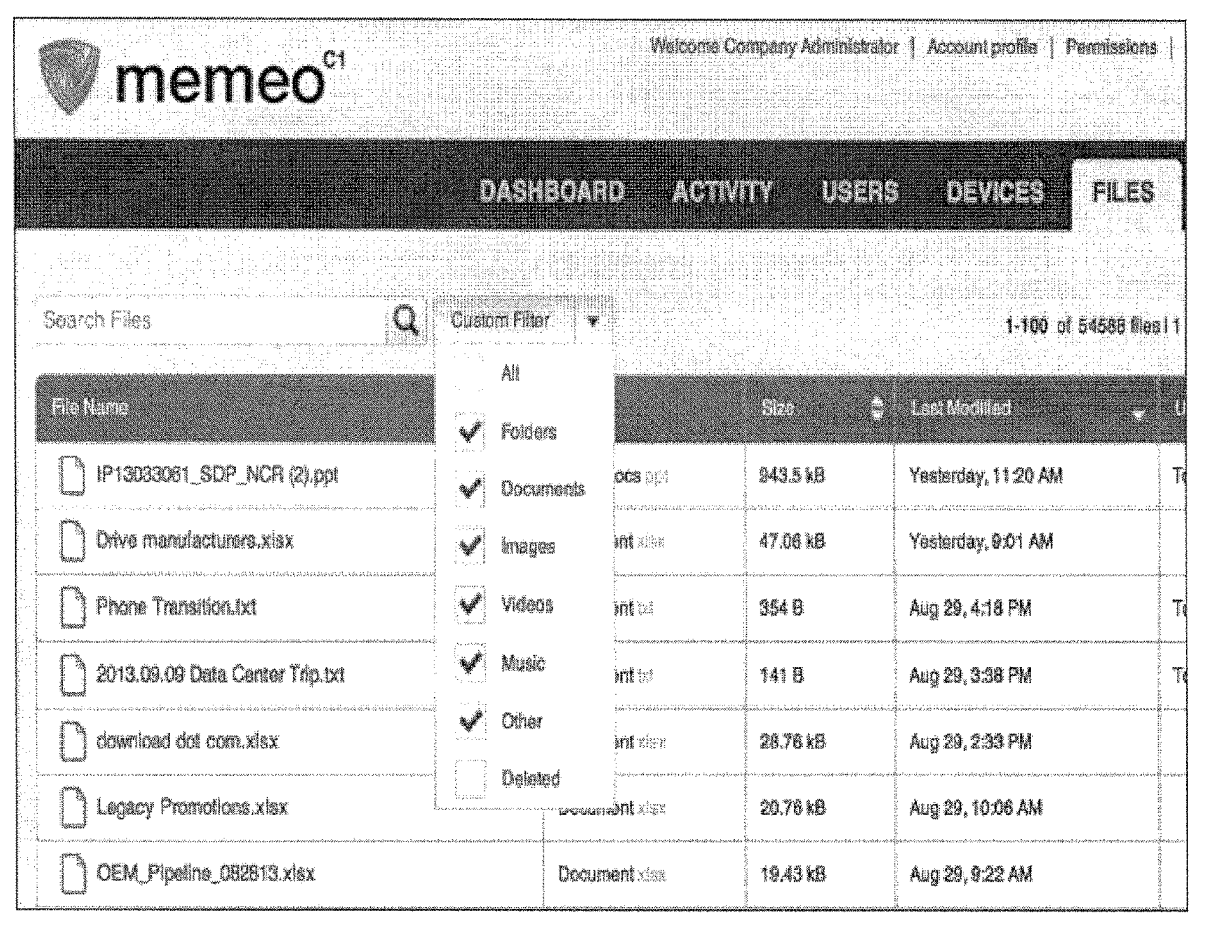

FIG. 16 shows an example screen including file search and categorization, under an embodiment. Using automatic data discovery and segmentation functionality, IT administrators can identify sensitive business files based on deep content searches and key term extraction. IT administrators can then search for and view specific documents that contain proprietary information (e.g., customer, employee and financial information) as well as set up specific restrictions to control this information. In addition to closely managing sensitive documents, IT administrators can search for files across the organization by file name. IT administrators can also view the total of files synced throughout the organization to understand the file type breakdown (documents, music, video, etc.) or distribution of files based on size. This information helps IT administrators spot users that may be adding personal content to the service or otherwise misusing the solution.

Figure 17:
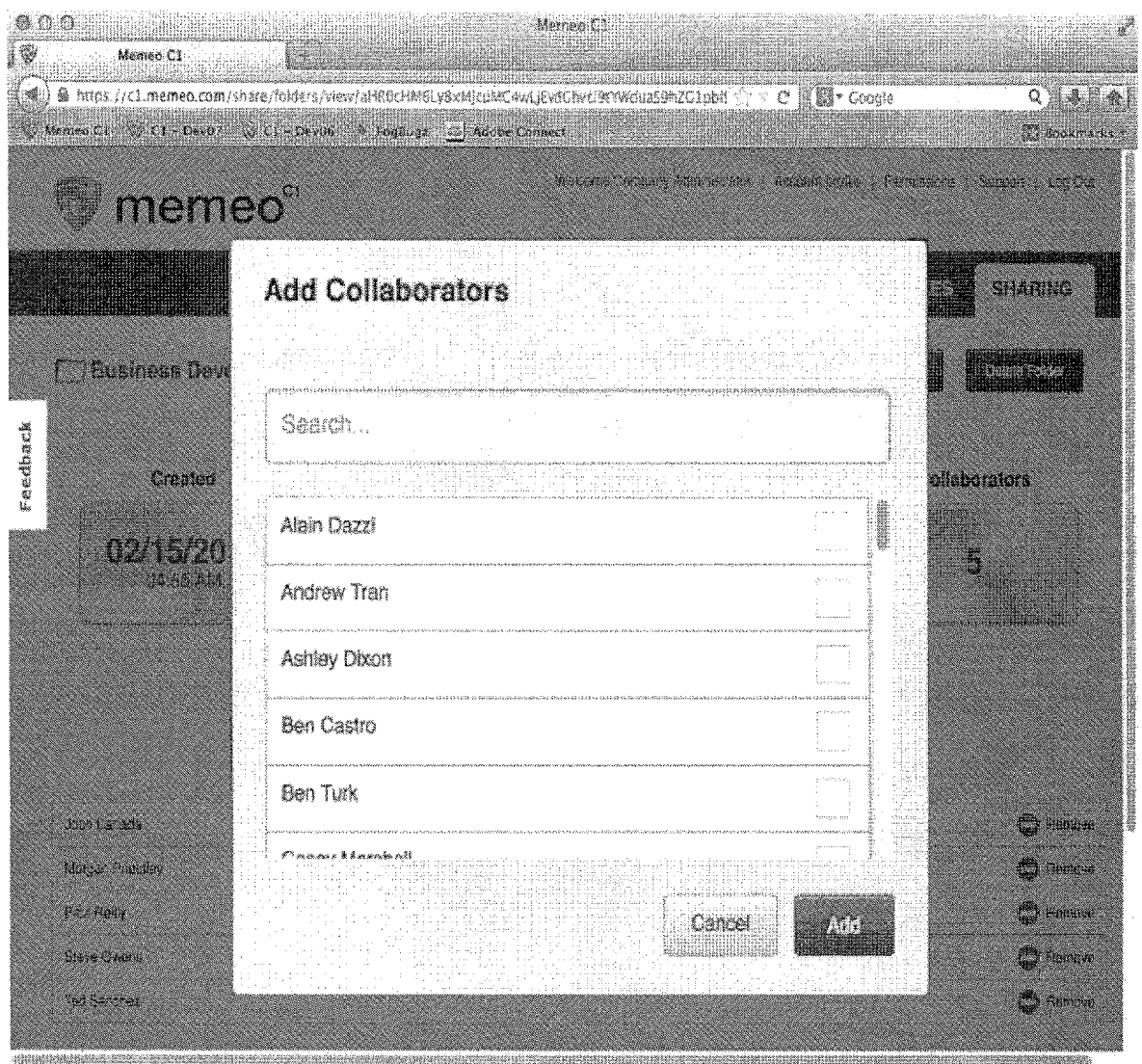
FIG. 17 shows an example screen including controlled user sharing, under an embodiment.

The platform allows IT administrators to determine which users can share documents within the organization by setting up shared folders with specific collaborators. Unauthorized users do not have the ability to access shared folders without the permission of the IT administrator or trusted user. IT administrators can also control which users are allowed to share via one-way web links. In addition, for both web links and shared folders, the IT administrator has a complete history of all sharing activities (file additions, modifications or deletions by user, device, location, etc.). FIG. 17 shows an example screen including controlled user sharing, under an embodiment.

Figure 18:
FIG. 18 shows an example screen including remote device management and geolocation services, under an embodiment.

FIG. 18 shows an example screen including remote device management and geolocation services, under an embodiment. IT administrators can remotely manage mobile devices and desktops through the management console. For example, if an employee is terminated from the organization, the IT administrator can remotely remove the user from any sharing activities, unlink a device from a user's account and suspend services for the device. An IT administrator can also perform a remote wipe of a particular device, instantly removing sensitive business content. The platform integrates geolocation services into the management console to identify specific locations for system events and to monitor the location of mobile devices and computers. This is particularly useful if an IT administrator wants to restrict business content from home computers and other personal devices.

Figure 19:
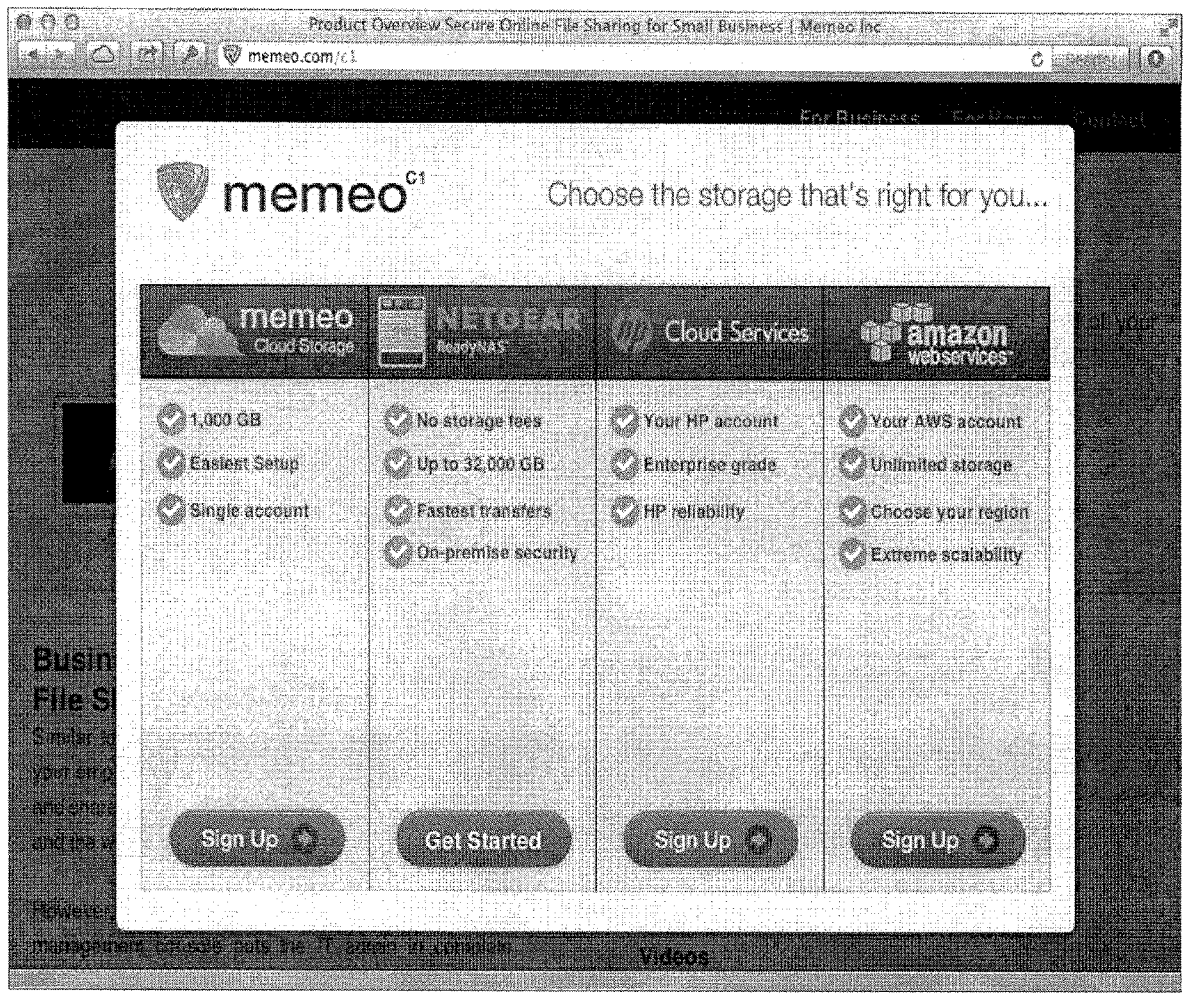
FIG. 19 shows an example screen including selection of storage location, under an embodiment.

The platform allows IT administrators to choose the storage location of their core business files. An IT administrator may choose to store files in the Memeo data center, with another cloud storage provider (e.g., HP or Amazon) or on-premise in a server or NAS environment (e.g., NETGEAR). FIG. 19 shows an example screen including selection of storage location, under an embodiment. The flexible storage model enhances security for customers by enabling them to store files locally or with a cloud provider with whom they already have experience. In addition, the approach allows IT administrators to utilize existing storage infrastructure, which reduces operating costs.

Embodiments described herein include a system comprising a platform including a processor coupled to a plurality of databases. The system includes a grid comprising a plurality of agents coupled to the platform. Each agent of the plurality of agents is an agent of the platform running on a client device. The system comprises metadata of content of memory accessible by a plurality of client devices corresponding to the plurality of agents. Each agent of each client device generates and provides the metadata to the platform. The platform comprises the metadata instead of the content and uses the metadata to determine locations of the content, generate goals representing operations for maintaining a state of the content, and generate a plurality of tasks corresponding to the goals and assign each task to an agent having access to the content that corresponds to the task. Each task is a processing operation directed by the platform to be performed by an agent on content accessible by the agent.

Embodiments described herein include a system comprising: a platform comprising a processor coupled to a plurality of databases; a grid comprising a plurality of agents coupled to the platform, wherein each agent of the plurality of agents is an agent of the platform running on a client device; and metadata of content of memory accessible by a plurality of client devices corresponding to the plurality of agents, wherein each agent of each client device generates and provides the metadata to the platform, wherein the platform comprises the metadata instead of the content and uses the metadata to determine locations of the content, generate goals representing operations for maintaining a state of the content, and generate a plurality of tasks corresponding to the goals and assign each task to an agent having access to the content that corresponds to the task, wherein each task is a processing operation directed by the platform to be performed by an agent on content accessible by the agent.

The platform of an embodiment is a master controller for the plurality of agents, wherein the plurality of agents work in cooperation with the platform as controlled by the plurality of tasks.

Each agent of the plurality of agents of an embodiment functions independently of the platform and any other agent of the plurality of agents.

The platform of an embodiment receives the metadata of the content instead of receiving the content, wherein a plurality of client devices hosting the plurality of agents comprise distributive storage devices that include the content.

The platform of an embodiment uses the metadata to maintain at the plurality of databases a master index of the content of the plurality of agents.

The metadata of an embodiment comprises data on location of the content.

The metadata of an embodiment comprises data on state of the content.

The metadata of an embodiment comprises data on identity of the plurality of agents.

The metadata of an embodiment comprises data on the content to which each agent has access.

The metadata of an embodiment comprises information of the plurality of tasks performed by the plurality of agents.

The task of an embodiment is related to tracking location of the content across the grid.

The task of an embodiment is related to managing storage of the content across the grid.

The task of an embodiment is related to managing movement of the content across the grid.

The task of an embodiment is related to processing the content across the grid.

Each task of an embodiment comprises conditions of completion for the task.

The plurality of agents of an embodiment collectively monitors the content as directed by the platform.

The plurality of agents of an embodiment collectively stores the content as directed by the platform.

The plurality of agents of an embodiment collectively transfers the content as directed by the platform.

The plurality of agents of an embodiment collectively performs processing operations on the content as directed by the platform.

Each agent of each client device of an embodiment indexes content of memory accessible by the client device.

The plurality of databases of an embodiment includes an agent database that comprises agents available to the platform and information of each agent.

Each agent of an embodiment includes at least one library, wherein a library represents a device to which the agent has access including at least one of read access and write access.

The plurality of databases of an embodiment includes a libraries database that comprises a list of libraries corresponding to the plurality of agents, wherein each library of the grid is separately represented in the libraries database.

Each agent of an embodiment has access to each library corresponding to the agent.

The plurality of databases of an embodiment include a goals database that comprises a list of the goals, wherein each goal of the list of goals is generated by the platform and corresponds to at least one library, wherein the goal is used to execute operations on corresponding library contents.

The list of goals of an embodiment comprises a collection of libraries on which tasks are to be performed.

Each goal of an embodiment corresponds to at least one library and is used by an agent to execute at least one task on content of a corresponding library.

The platform of an embodiment uses the goals to read a plurality of libraries of the plurality of agents.

The platform of an embodiment uses the goals to identify at least one of inconsistencies and discrepancies in the content accessible by the plurality of agents.

The platform of an embodiment uses the goals to generate at least one task to eliminate at least one of inconsistencies and discrepancies identified in the content.

The plurality of databases of an embodiment includes a work database.

The platform of an embodiment generates a work database corresponding to each agent, wherein the work database includes tasks that are to be performed by the corresponding agent.

The work database of an embodiment includes a description of each task that is to be performed by a corresponding agent and information necessary for the agent to perform the task.

The plurality of databases of an embodiment includes a capabilities database that comprises information of capabilities of the plurality of agents.

The plurality of databases of an embodiment includes a synchronization database that includes and maintains a record of the plurality of agents.

The synchronization database of an embodiment includes a record of file states of content of the plurality of agents.

The synchronization database of an embodiment includes an entry for each file, wherein the entry includes a content hash corresponding to the file, wherein the content hash comprises a hash of a list of blobs representing the content of the file, wherein each blob of the list of blobs comprises a representation of a fragment of a file in the content, wherein the fragment is a component of the file.

The synchronization database of an embodiment includes an entry for each agent, wherein the entry includes a content hash corresponding to files of the agent, wherein the content hash comprises a hash of a list of blobs representing the content of the files, wherein each blob of the list of blobs comprises a representation of a fragment of a file in the content, wherein the fragment is a component of the file.

The platform of an embodiment controls transfer of content among client devices using the plurality of agents.

The platform of an embodiment controls synchronizing of the content among client devices using the plurality of agents, wherein the synchronizing of the content includes synchronizing the content in response to changes in the content.

The transfer of content of an embodiment comprises block-level, non-sequential transfer of content.

The transfer of content of an embodiment comprises transferring a first block of the content from a second client device to a first client device and transferring a second block of the content from a third client device to a first client device.

The plurality of tasks of an embodiment includes a scan task.

The scan task of an embodiment includes the agent recursively monitoring a library corresponding to the agent and reporting to the platform any changes to the library.

The reporting of an embodiment comprises placing a file of the library that includes the changes in a local database of the client device hosting the agent, and providing the metadata of the local database to the platform.

The plurality of tasks of an embodiment includes a write task.

The write task of an embodiment includes the agent copying at least one blob of a file from a first location to a second location, wherein each of the first location and second location correspond to client devices coupled to the grid.

The at least one blob of an embodiment comprises a representation of a fragment of a file in the content, wherein the fragment is a component of the file.

The write task of an embodiment comprises conditions of completion.

The conditions of completion of an embodiment comprise at least one of retrieving the blob corresponding to the write task and identifying that the blob to be overwritten during the write task corresponds to a correct file.

The plurality of tasks of an embodiment comprises an upload task that includes copying a representation of the content from a device accessible by the agent to a remote storage device.

The agent of an embodiment reports to the platform addition of the file to the content accessible by the agent and, in response the platform assigns a task to the agent to upload the file.

In response to the task the agent of an embodiment determines if the file is present at the remote storage device, and uploads the representation of the file to the remote storage device when the file is determined to be absent.

The upload task of an embodiment includes the agent copying at least one blob of a file from the device accessible by the agent to the remote storage device.

The at least one blob of an embodiment comprises a representation of a fragment of the file, wherein the fragment is a component of the file.

The plurality of tasks of an embodiment includes a delete task.

A task of an embodiment comprises a plurality of phases including at least one of queued, pending, and completed, wherein the platform tracks the phase of each task of the plurality of tasks.

Each agent of an embodiment maintains locally at the client device tasks assigned to the agent.

The agent of an embodiment periodically polls the platform to identify assigned tasks.

An agent of an embodiment comprises a hierarchy for locating task information needed to complete a task and located at a remote device.

The hierarchy of an embodiment comprises the agent searching a local database of the client device hosting the agent.

The hierarchy of an embodiment comprises the agent communicating with at least one peer agent of the plurality of agents to locate the task information.

The agent of an embodiment comprises identity of peer agents that possess the task information.

The hierarchy of an embodiment comprises the agent retrieving the task information from a remote storage device.

The agent of an embodiment receives from the platform the identity of peer agents in an ordered list and searches for the task information in accordance with the ordered list.

Each agent of an embodiment includes a plurality of components executing in parallel.

The plurality of components of an embodiment include a provider component that retrieves tasks designated for the agent from the platform and stores retrieved tasks in a task database local to the client device hosting the agent.

The plurality of components of an embodiment comprises a task execution component.

The plurality of components of an embodiment include a runner component that monitors the task database, retrieves each task from the task database, and provides a retrieved task to the task execution component and designates the retrieved task to have a pending status.

The task execution component of an embodiment executes the task, and reports status of task execution to the runner component.

The runner component of an embodiment reports the status to the task database.

The plurality of components of an embodiment includes an update component that monitors the task database for tasks having a completed status, and reports status information of completed tasks to the platform.

The platform of an embodiment updates the plurality of databases in response to the status information.

The metadata of an embodiment is generated by the plurality of agents, wherein metadata generated by an agent corresponds to the content to which the agent has access.

The agent of an embodiment generates the metadata by scanning content of each file to which the agent has access.

The agent of an embodiment generates the metadata by splitting the content of the file into a plurality of fragments, wherein each fragment comprises a variable size component of the file.

The variable size fragments of an embodiment are between a pre-specified minimum length and maximum length.

The agent of an embodiment generates the metadata by generating a plurality of blobs that represent the plurality of fragments, wherein each blob represents a fragment.

The agent of an embodiment generates the plurality of blobs using a data fingerprinting algorithm that comprises running, for each byte in the content, a hash algorithm over components of the content, wherein the hash algorithm is set to identify a specified pattern of data.

The generating of the blob of an embodiment comprises generating a description of the blob that includes a value of a hash at a point where the fragment represented by the blob was separated from a remaining portion of the file.

The generating of the blob of an embodiment comprises generating an offset value based on a break point of the fragment represented by the blob.

The generating of the blob of an embodiment comprises generating a hash of complete contents of the blob, wherein the hash of the complete contents of the blob is an identifier for the blob.

The generating of the blob of an embodiment comprises generating a list of blobs representing the content of the file.

The generating of the blob of an embodiment includes generating a content hash that comprises a hash of the list of blobs representing the content of the file, wherein the content hash is an identifier for the file.

The generating of the blob of an embodiment includes generating a name hash that comprises a hash of a file name corresponding to the file.

The generating of the blob of an embodiment includes generating a file hash that comprises a hash of a combination of the content hash and a name hash.

The generating of the blob of an embodiment includes generating a path hash that comprises a hash of the file name and a file path corresponding to the content of the file.

The generating of the blob of an embodiment includes generating a metadata hash that comprises a hash of file metadata of the file.

The platform of an embodiment generates a record for the file, and the record comprises blob hashes of the file, the content hash, the file hash, the path hash and the metadata hash.

The plurality of databases of an embodiment includes a libraries database, wherein the libraries database comprises the record.

The generating of the blob of an embodiment comprises generating a size of the blob.

The file of an embodiment is described as a list of blobs comprising the file.

Each agent of an embodiment stores a blob locally at the client device hosting the agent, and transfers a blob that is previously unreported to central storage of the platform.

Embodiments described herein include a system comprising a platform including a processor coupled to a plurality of databases. The system includes a grid comprising a plurality of agents coupled to the platform. Each agent of the plurality of agents is an agent of the platform running on a client device. The system comprises metadata of content of memory accessible by a plurality of client devices corresponding to the plurality of agents. The agents generate and provide to the platform metadata that corresponds to the content by hashing a plurality of fragments of the content. The platform uses the metadata instead of the content to generate and assign to the plurality of agents a plurality of tasks including tasks controlling at least one of storing, transferring and processing of the content. A task is a processing operation performed on content accessible by the agent responsible for the task.

Embodiments described herein include a system comprising: a platform comprising a processor coupled to a plurality of databases; a grid comprising a plurality of agents coupled to the platform, wherein each agent of the plurality of agents is an agent of the platform running on a client device; and metadata of content of memory accessible by a plurality of client devices corresponding to the plurality of agents, wherein the agents generate and provide to the platform metadata that corresponds to the content by hashing a plurality of fragments of the content, wherein the platform uses the metadata instead of the content to generate and assign to the plurality of agents a plurality of tasks including tasks controlling at least one of storing, transferring and processing of the content, wherein a task is a processing operation performed on content accessible by the agent responsible for the task.

Embodiments described herein include a system comprising a platform including a processor coupled to a plurality of databases. The system includes a grid comprising a plurality of agents coupled to the platform. Each agent of the plurality of agents is an agent of the platform running on a client device. Each agent of each client device provides to the platform metadata of content of memory accessible by the client device. The platform uses the metadata to determine locations of the content, generate goals representing operations for maintaining a state of the content, and generate a plurality of tasks corresponding to the goals and assign each task to an agent having access to the content that corresponds to the task. A task is a processing operation directed by the platform to be performed by an agent on content accessible by the agent. The metadata provided by plurality of agents includes information of the plurality of tasks performed by the plurality of agents.

Embodiments described herein include a system comprising: a platform comprising a processor coupled to a plurality of databases; and a grid comprising a plurality of agents coupled to the platform, wherein each agent of the plurality of agents is an agent of the platform running on a client device; wherein each agent of each client device provides to the platform metadata of content of memory accessible by the client device; wherein the platform uses the metadata to determine locations of the content, generate goals representing operations for maintaining a state of the content, and generate a plurality of tasks corresponding to the goals and assign each task to an agent having access to the content that corresponds to the task, wherein a task is a processing operation directed by the platform to be performed by an agent on content accessible by the agent, wherein the metadata provided by plurality of agents includes information of the plurality of tasks performed by the plurality of agents.

Embodiments described herein include a system comprising a platform including a processor coupled to a plurality of databases. The system includes a grid comprising a plurality of agents coupled to the platform. Each agent of the plurality of agents is an agent of the platform running on a client device. The system comprises metadata of content of memory accessible by a plurality of client devices corresponding to the plurality of agents. Each agent generates and provides to the platform metadata that corresponds to the content to which the agent has access. Each agent generates the metadata by hashing a plurality of fragments of the content to generate a plurality of blobs representing the plurality of fragments. The platform uses the metadata instead of the content to generate and assign to the plurality of agents a plurality of tasks. A task is a processing operation performed on content accessible by the agent responsible for the task. The plurality of tasks includes tasks that at least one of monitor, store, transfer and process the content.

Embodiments described herein include a system comprising: a platform comprising a processor coupled to a plurality of databases; a grid comprising a plurality of agents coupled to the platform, wherein each agent of the plurality of agents is an agent of the platform running on a client device; metadata of content of memory accessible by a plurality of client devices corresponding to the plurality of agents, wherein each agent generates and provides to the platform metadata that corresponds to the content to which the agent has access, wherein each agent generates the metadata by hashing a plurality of fragments of the content to generate a plurality of blobs representing the plurality of fragments, wherein the platform uses the metadata instead of the content to generate and assign to the plurality of agents a plurality of tasks, wherein a task is a processing operation performed on content accessible by the agent responsible for the task, wherein the plurality of tasks includes tasks that at least one of monitor, store, transfer and process the content.

Embodiments described herein include a method comprising coupling a platform comprising a processor to a plurality of databases. The method comprises forming a grid by coupling a plurality of agents to the platform. Each agent of the plurality of agents is an agent of the platform running on a client device. The method comprises generating metadata at each agent and providing the metadata to the platform instead of content. The metadata corresponds to the content of memory accessible by a plurality of client devices corresponding to the plurality of agents. The method comprises determining with the metadata locations of the content. The method comprises generating goals with the metadata representing operations for maintaining a state of the content. The method comprises generating with the metadata a plurality of tasks corresponding to the goals. The method comprises assigning each task to an agent having access to the content that corresponds to the task. Each task is a processing operation directed by the platform to be performed by an agent on content accessible by the agent.

Embodiments described herein include a method comprising: coupling a platform comprising a processor to a plurality of databases; forming a grid by coupling a plurality of agents to the platform, wherein each agent of the plurality of agents is an agent of the platform running on a client device; generating metadata at each agent and providing the metadata to the platform instead of content, wherein the metadata corresponds to the content of memory accessible by a plurality of client devices corresponding to the plurality of agents; determining with the metadata locations of the content; generating goals with the metadata representing operations for maintaining a state of the content; generating with the metadata a plurality of tasks corresponding to the goals; and assigning each task to an agent having access to the content that corresponds to the task, wherein each task is a processing operation directed by the platform to be performed by an agent on content accessible by the agent.

The method comprises the platform operating as a master controller for the plurality of agents, wherein the plurality of agents work in cooperation with the platform as controlled by the plurality of tasks.

The method comprises each agent of the plurality of agents functioning independently of the platform and any other agent of the plurality of agents.

The method comprises the platform receiving the metadata of the content instead of receiving the content, wherein a plurality of client devices hosting the plurality of agents comprise distributive storage devices that include the content.

The method comprises the platform using the metadata to maintain at the plurality of databases a master index of the content of the plurality of agents.

The metadata of an embodiment comprises data on location of the content.

The metadata of an embodiment comprises data on state of the content.

The metadata of an embodiment comprises data on identity of the plurality of agents.

The metadata of an embodiment comprises data on the content to which each agent has access.

The metadata of an embodiment comprises information of the plurality of tasks performed by the plurality of agents.

The task of an embodiment is related to tracking location of the content across the grid.

The task of an embodiment is related to managing storage of the content across the grid.

The task of an embodiment is related to managing movement of the content across the grid.

The task of an embodiment is related to processing the content across the grid.

Each task of an embodiment comprises conditions of completion for the task.

The method comprises the plurality of agents collectively monitoring the content as directed by the platform.

The method comprises the plurality of agents collectively storing the content as directed by the platform.

The method comprises the plurality of agents collectively transferring the content as directed by the platform.

The method comprises the plurality of agents collectively performing processing operations on the content as directed by the platform.

The method comprises each agent of each client device indexing contents of memory accessible by the client device.

The plurality of databases of an embodiment includes an agent database that comprises agents available to the platform and information of each agent.

Each agent of an embodiment includes at least one library, wherein a library represents a device to which the agent has access including at least one of read access and write access.

The plurality of databases of an embodiment includes a libraries database that comprises a list of libraries corresponding to the plurality of agents, wherein each library of the grid is separately represented in the libraries database.

The method comprises each agent having access to each library corresponding to the agent.

The plurality of databases of an embodiment includes a goals database that comprises a list of the goals, wherein each goal of the list of goals is generated by the platform and corresponds to at least one library, wherein the goal is used to execute operations on corresponding library contents.

The method comprises generating the list of goals to include a collection of libraries on which tasks are to be performed.

Each goal of an embodiment corresponds to at least one library and is used by an agent to execute at least one task on content of a corresponding library.

The method comprises the platform using the goals to read a plurality of libraries of the plurality of agents.

The method comprises the platform using the goals to identify at least one of inconsistencies and discrepancies in the content accessible by the plurality of agents.

The method comprises the platform using the goals to generate at least one task to eliminate at least one of inconsistencies and discrepancies identified in the content.

The plurality of databases of an embodiment includes a work database.

The method comprises the platform generating a work database corresponding to each agent, wherein the work database includes tasks that are to be performed by the corresponding agent.

The work database of an embodiment includes a description of each task that is to be performed by a corresponding agent and information necessary for the agent to perform the task.

The plurality of databases of an embodiment includes a capabilities database that comprises information of capabilities of the plurality of agents.

The plurality of databases of an embodiment includes a synchronization database that includes and maintains a record of the plurality of agents.

The synchronization database of an embodiment includes a record of file states of content of the plurality of agents.

The synchronization database of an embodiment includes an entry for each file, wherein the entry includes a content hash corresponding to the file, wherein the content hash comprises a hash of a list of blobs representing the content of the file, wherein each blob of the list of blobs comprises a representation of a fragment of a file in the content, wherein the fragment is a component of the file.

The synchronization database of an embodiment includes an entry for each agent, wherein the entry includes a content hash corresponding to files of the agent, wherein the content hash comprises a hash of a list of blobs representing the content of the files, wherein each blob of the list of blobs comprises a representation of a fragment of a file in the content, wherein the fragment is a component of the file.

The method comprises the platform controlling transfer of content among client devices using the plurality of agents.

The method comprises the platform controlling synchronizing of the content among client devices using the plurality of agents, wherein the synchronizing of the content includes synchronizing the content in response to changes in the content.

The transfer of content comprises block-level, non-sequential transfer of content.

The transfer of content comprises transferring a first block of the content from a second client device to a first client device and transferring a second block of the content from a third client device to a first client device.

The plurality of tasks of an embodiment includes a scan task.

The scan task of an embodiment includes the agent recursively monitoring a library corresponding to the agent and reporting to the platform any changes to the library.

The reporting comprises placing a file of the library that includes the changes in a local database of the client device hosting the agent, and providing the metadata of the local database to the platform.

The plurality of tasks of an embodiment includes a write task.

The write task of an embodiment includes the agent copying at least one blob of a file from a first location to a second location, wherein each of the first location and second location correspond to client devices coupled to the grid.

The at least one blob of an embodiment comprises a representation of a fragment of a file in the content, wherein the fragment is a component of the file.

The write task of an embodiment comprises conditions of completion.

The conditions of completion of an embodiment comprise at least one of retrieving the blob corresponding to the write task and identifying that the blob to be overwritten during the write task corresponds to a correct file.

The plurality of tasks of an embodiment comprises an upload task that includes copying a representation of a file of the content from a device accessible by the agent to a remote storage device.

The method comprises the agent reporting to the platform addition of the file to the content accessible by the agent and, in response the platform assigns a task to the agent to upload the file.

The method comprises in response to the task the agent determining if the file is present at the remote storage device, and uploads the representation of the file to the remote storage device when the file is determined to be absent.

The upload task of an embodiment includes the agent copying at least one blob of a file from the device accessible by the agent to the remote storage device.

The at least one blob of an embodiment comprises a representation of a fragment of the file, wherein the fragment is a component of the file.

The plurality of tasks of an embodiment includes a delete task.

A task of an embodiment comprises a plurality of phases including at least one of queued, pending, and completed, wherein the platform tracks the phase of each task of the plurality of tasks.

The method comprises each agent maintaining locally at the client device tasks assigned to the agent.

The method comprises the agent periodically polling the platform to identify assigned tasks.

An agent of an embodiment comprises a hierarchy for locating task information needed to complete a task and located at a remote device.

The hierarchy of an embodiment comprises the agent searching a local database of the client device hosting the agent.

The hierarchy of an embodiment comprises the agent communicating with at least one peer agent of the plurality of agents to locate the task information.

The agent of an embodiment comprises identity of peer agents that possess the task information.

The hierarchy of an embodiment comprises the agent retrieving the task information from a remote storage device.

The method comprises the agent receiving from the platform the identity of peer agents in an ordered list and searching for the task information in accordance with the ordered list.

Each agent of an embodiment includes a plurality of components executing in parallel.

The plurality of components of an embodiment include a provider component that retrieves tasks designated for the agent from the platform and stores retrieved tasks in a task database local to the client device hosting the agent.

The plurality of components of an embodiment comprises a task execution component.

The plurality of components of an embodiment include a runner component that monitors the task database, retrieves each task from the task database, and provides a retrieved task to the task execution component and designates the retrieved task to have a pending status.

The method comprises the task execution component executing the task, and reports status of task execution to the runner component.

The method comprises the runner component reporting the status to the task database.

The plurality of components of an embodiment includes an update component that monitors the task database for tasks having a completed status, and reports status information of completed tasks to the platform.

The method comprises the platform updating the plurality of databases in response to the status information.

The method comprises the plurality of agents generating the metadata, wherein metadata generated by an agent corresponds to the content to which the agent has access.

The method comprises the agent generating the metadata by scanning content of each file to which the agent has access.

The method comprises the agent generating the metadata by splitting the content of the file into a plurality of fragments, wherein each fragment comprises a variable size component of the file.

The variable size fragments of an embodiment are between a pre-specified minimum length and maximum length.

The method comprises the agent generating the metadata by generating a plurality of blobs that represent the plurality of fragments, wherein each blob represents a fragment.

The method comprises the agent generating the plurality of blobs using a data fingerprinting algorithm that comprises running, for each byte in the content, a hash algorithm over components of the content, wherein the hash algorithm is set to identify a specified pattern of data.

The generating of the blob of an embodiment comprises generating a description of the blob that includes a value of a hash at a point where the fragment represented by the blob was separated from a remaining portion of the file.

The generating of the blob of an embodiment comprises generating an offset value based on a break point of the fragment represented by the blob.

The generating of the blob of an embodiment comprises generating a hash of complete contents of the blob, wherein the hash of the complete contents of the blob is an identifier for the blob.

The generating of the blob of an embodiment comprises generating a list of blobs representing the content of the file.

The generating of the blob of an embodiment includes generating a content hash that comprises a hash of the list of blobs representing the content of the file, wherein the content hash is an identifier for the file.

The generating of the blob of an embodiment includes generating a name hash that comprises a hash of a file name corresponding to the file.

The generating of the blob of an embodiment includes generating a file hash that comprises a hash of a combination of the content hash and a name hash.

The generating of the blob of an embodiment includes generating a path hash that comprises a hash of the file name and a file path corresponding to the content of the file.

The generating of the blob of an embodiment includes generating a metadata hash that comprises a hash of file metadata of the file.

The method comprises the platform generating a record for the file, wherein the record comprises blob hashes of the file, the content hash, the file hash, the path hash and the metadata hash.

The plurality of databases of an embodiment includes a libraries database, wherein the libraries database comprises the record.

The generating of the blob of an embodiment comprises generating a size of the blob.

The file of an embodiment is described as a list of blobs comprising the file.

The method comprises each agent storing a blob locally at the client device hosting the agent, and transferring a blob that is previously unreported to central storage of the platform.

The platform comprises a policy database and a rules engine.

The method comprises analyzing each file of the content.

The method comprises delineating each file of the content as at least one of business content and personal content.

The method comprises determining for the business content a confidentiality level of each file of the content.

The method comprises scanning and extracting key terms from each file of the content.

The method comprises comparing the key terms across an enterprise and generating a list of enterprise-specific key terms.

The determining of the confidentiality level comprises identifying specific key terms of the key terms.

The generating of the metadata comprises generating the metadata to include the confidentiality level of corresponding content.

The method comprises controlling access to each file of the content based on the confidentiality level.

The controlling of the access comprises controlling viewing of each file of the content.

The controlling of the access comprises controlling downloading of each file of the content.

The controlling of the access comprises controlling accessing of each file of the content.

The controlling of the access comprises controlling copying of each file of the content.

The controlling of the access comprises controlling distributing of each file of the content.

The method comprises delineating each file of the content based on inferences made from the content.

The method comprises delineating each file of the content based on syntax of the content.

The method comprises identifying business content of the content across at least one of the locations and the plurality of agents, wherein the identifying of the business content comprises using at least one of document name, document size, proximity, key word comparison, and hash comparison.

The method comprises controlling collaboration among a plurality of devices accessing a file of the content.

The method comprises controlling editing of content among a plurality of devices simultaneously editing a file of the content.

The method comprises tracking activity involving a file of the content.

The method comprises tracking revision history of a file of the content.

The method comprises mobile device management that includes monitoring and controlling access to the content via mobile devices.

The mobile device management comprises tracking location of a mobile device.

The mobile device management comprises controlling access to the content based on the location.

The mobile device management comprises tracking data of a mobile device.

The method comprises coupling a console to the platform. The console includes automated activity monitoring, auditing, and reporting involving the content.

The method comprises controlling via the console activity involving the content.

The method comprises controlling via the console the location.

The controlling of the activity comprises at least one of controlling viewing of each file of the content, controlling downloading of each file of the content, controlling accessing of each file of the content, controlling copying of each file of the content, and controlling distributing of each file of the content.

Embodiments described herein include a method comprising coupling a platform comprising a processor to a plurality of databases. The method comprises forming a grid comprising a plurality of agents coupled to the platform. Each agent is an agent of the platform running on a client device. The method comprises generating metadata at each agent by hashing a plurality of fragments of content accessible by the agent. The metadata corresponds to the content of memory accessible by a plurality of client devices corresponding to the plurality of agents. The method comprises providing the metadata to the platform instead of the content. The method comprises generating with the metadata a plurality of tasks including tasks controlling at least one of storing, transferring and processing of the content. A task is a processing operation performed on content accessible by the agent responsible for the task. The method comprises assigning the plurality of tasks to the plurality of agents.

Embodiments described herein include a method comprising: coupling a platform comprising a processor to a plurality of databases; forming a grid comprising a plurality of agents coupled to the platform, wherein each agent is an agent of the platform running on a client device; generating metadata at each agent by hashing a plurality of fragments of content accessible by the agent, wherein the metadata corresponds to the content of memory accessible by a plurality of client devices corresponding to the plurality of agents; providing the metadata to the platform instead of the content; generating with the metadata a plurality of tasks including tasks controlling at least one of storing, transferring and processing of the content, wherein a task is a processing operation performed on content accessible by the agent responsible for the task; and assigning the plurality of tasks to the plurality of agents.

Embodiments described herein include a method comprising coupling a platform comprising a processor to a plurality of databases. The method comprises forming a grid comprising a plurality of agents coupled to the platform. Each agent is an agent of the platform running on a client device. The method comprises providing to the platform by each agent of each client device metadata of content of memory accessible by the client device. The method comprises determining with the metadata locations of the content. The method comprises generating goals with the metadata representing operations for maintaining a state of the content. The method comprises generating with the metadata a plurality of tasks corresponding to the goals. The method comprises assign each task to an agent having access to the content that corresponds to the task. A task is a processing operation directed by the platform to be performed by an agent on content accessible by the agent. The metadata provided by plurality of agents includes information of the plurality of tasks performed by the plurality of agents.

Embodiments described herein include a method comprising: coupling a platform comprising a processor to a plurality of databases; forming a grid comprising a plurality of agents coupled to the platform, wherein each agent is an agent of the platform running on a client device; providing to the platform by each agent of each client device metadata of content of memory accessible by the client device; determining with the metadata locations of the content; generating goals with the metadata representing operations for maintaining a state of the content; generating with the metadata a plurality of tasks corresponding to the goals; and assign each task to an agent having access to the content that corresponds to the task, wherein a task is a processing operation directed by the platform to be performed by an agent on content accessible by the agent, wherein the metadata provided by plurality of agents includes information of the plurality of tasks performed by the plurality of agents.

Embodiments described herein include a method comprising establishing a coupling between a platform comprising a processor and a plurality of databases. The method comprises forming a grid by coupling a plurality of agents to the platform. Each agent of the plurality of agents is an agent of the platform running on a client device. The method comprises generating metadata at each agent representing content of memory accessible by a plurality of client devices corresponding to the plurality of agents. The generating comprises hashing a plurality of fragments of the content to generate a plurality of blobs representing the plurality of fragments. The method comprises providing the metadata to the platform instead of the content. The method comprises generating with the metadata a plurality of tasks. A task is a processing operation performed on content accessible by the agent responsible for the task. The plurality of tasks include tasks that at least one of monitor, store, transfer and process the content; and assigning the plurality of tasks to the plurality of agents.

Embodiments described herein include a method comprising: establishing a coupling between a platform comprising a processor and a plurality of databases; forming a grid by coupling a plurality of agents to the platform, wherein each agent of the plurality of agents is an agent of the platform running on a client device; generating metadata at each agent representing content of memory accessible by a plurality of client devices corresponding to the plurality of agents, wherein the generating comprises hashing a plurality of fragments of the content to generate a plurality of blobs representing the plurality of fragments; providing the metadata to the platform instead of the content; generating with the metadata a plurality of tasks, wherein a task is a processing operation performed on content accessible by the agent responsible for the task, wherein the plurality of tasks include tasks that at least one of monitor, store, transfer and process the content; and assigning the plurality of tasks to the plurality of agents.

As described above, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The components described herein can be components of a single system, multiple systems, and/or geographically separate systems. The components described herein can also be a subcomponent or subsystem of a single system, multiple systems, and/or geographically separate systems. The components described herein can be coupled to one or more other components (not shown) of a host system or a system coupled to the host system.

The components described herein include and/or run under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments and corresponding systems and methods is not intended to be exhaustive or to limit the systems and methods to the precise forms disclosed. While specific embodiments of, and examples for, systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the systems and methods in light of the above detailed description.

What is claimed is:

1. A method comprising:
coupling a platform comprising a processor and a rules engine to a plurality of databases including a policy database comprising one or more service policies;
forming a grid by coupling a plurality of agents to the platform, wherein each agent of the plurality of agents is an agent of the platform running on a client device and wherein the platform comprises data store indexes which index data blocks located across the grid and is configured to perform block level file transfers by moving data blocks within the grid;
generating metadata at each agent and providing the metadata to the platform instead of content, wherein the metadata corresponds to the content of memory accessible by a plurality of client devices corresponding to the plurality of agents;

using the metadata at the platform to track a location of the content and manage distributed storage, movement and processing of the content among the plurality of agents;

generating goals representing operations for maintaining a state of the content, wherein the goals are generated by the platform using information of the metadata;

generating a plurality of tasks corresponding to the goals, wherein the plurality of tasks is generated by the platform using information of the metadata;

assigning each task to an agent having access to content that corresponds to the task, wherein each task is a processing operation directed by the platform to be performed by an agent on content accessible by the agent and wherein each task assigned by the platform to the agent is based on the one or more service policies.

2. The method of claim 1, comprising the platform operating as a master controller for the plurality of agents, wherein the plurality of agents work in cooperation with the platform as controlled by the plurality of tasks.

3. The method of claim 1, comprising each agent of the plurality of agents functioning independently of the platform and any other agent of the plurality of agents.

4. The method of claim 1, comprising the platform receiving the metadata of the content instead of receiving the content, wherein a plurality of client devices hosting the plurality of agents comprise distributive storage devices that include the content.

5. The method of claim 1, comprising the platform using the metadata to maintain at the plurality of databases a master index of the content of the plurality of agents.

6. The method of claim 1, wherein the metadata comprises data on of the content.

7. The method of claim 1, wherein the metadata comprises data on state of the content.

8. The method of claim 1, wherein the metadata comprises data on identity of the plurality of agents.

9. The method of claim 1, wherein the metadata comprises data on the content to which each agent has access.

10. The method of claim 1, wherein the metadata comprises information of the plurality of tasks performed by the plurality of agents.

11. The method of claim 1, wherein the task is related to tracking location of the content across the grid.

12. The method of claim 1, wherein the task is related to managing storage of the content across the grid.

13. The method of claim 1, wherein the task is related to managing movement of the content across the grid.

14. The method of claim 1, wherein the task is related to processing the content across the grid.

15. The method of claim 1, wherein each task comprises conditions of completion for the task.

16. The method of claim 1, comprising the plurality of agents collectively monitoring the content as directed by the platform.

17. The method of claim 1, comprising the plurality of agents collectively storing the content as directed by the platform.

18. The method of claim 1, comprising the plurality of agents collectively transferring the content as directed by the platform.

19. The method of claim 1, comprising the plurality of agents collectively performing processing operations on the content as directed by the platform.

20. The method of claim 1, comprising each agent of each client device indexing contents of memory accessible by the client device.

21. The method of claim 1, wherein the plurality of databases include an agent database that comprises agents available to the platform and information of each agent.

22. The method of claim 1, wherein each agent includes at least one library, wherein a library represents a device to which the agent has access including at least one of read access and write access.

23. The method of claim 22, wherein the plurality of databases includes a libraries database that comprises a list of libraries corresponding to the plurality of agents, wherein each library of the grid is separately represented in the libraries database.

24. The method of claim 23, comprising each agent having access to each library corresponding to the agent.

25. The method of claim 22, wherein the plurality of databases includes a goals database that comprises a list of the goals, wherein each goal of the list of goals is generated by the platform and corresponds to at least one library, wherein the goal is used to execute operations on corresponding library contents.

26. The method of claim 25, comprising generating the list of goals to include a collection of libraries on which tasks are to be performed.

27. The method of claim 25, wherein each goal corresponds to at least one library and is used by an agent to execute at least one task on content of a corresponding library.

28. The method of claim 25, comprising the platform using the goals to read a plurality of libraries of the plurality of agents.

29. The method of claim 25, comprising the platform using the goals to identify at least one of inconsistencies and discrepancies in the content accessible by the plurality of agents.

30. The method of claim 29, comprising the platform using the goals to generate at least one task to eliminate at least one of inconsistencies and discrepancies identified in the content.

31. The method of claim 1, wherein the plurality of databases include a work database.

32. The method of claim 31, comprising the platform generating a work database corresponding to each agent, wherein the work database includes tasks that are to be performed by the corresponding agent.

33. The method of claim 32, wherein the work database includes a description of each task that is to be performed by a corresponding agent and information necessary for the agent to perform the task.

34. The method of claim 1, wherein the plurality of databases include a capabilities database that comprises information of capabilities of the plurality of agents.

35. The method of claim 1, wherein the plurality of databases include a synchronization database that includes and maintains a record of the plurality of agents.

36. The method of claim 35, wherein the synchronization database includes a record of file states of content of the plurality of agents.

37. The method of claim 36, wherein the synchronization database includes an entry for each file, wherein the entry includes a content hash corresponding to the file, wherein the content hash comprises a hash of a list of blobs representing the content of the file, wherein each blob of the list of blobs comprises a hash of a fragment of a file in the content, wherein the fragment is a component of the file.

38. The method of claim 36, wherein the synchronization database includes an entry for each agent, wherein the entry includes a content hash corresponding to files of the agent, wherein the content hash comprises a hash of a list of blobs representing the content of the files, wherein each blob of the list of blobs comprises a hash of a fragment of a file in the content, wherein the fragment is a component of the file.

39. The method of claim 1, comprising the platform controlling transfer of content among client devices using the plurality of agents.

40. The method of claim 39, comprising the platform controlling synchronizing of the content among client devices using the plurality of agents, wherein the synchronizing of the content includes synchronizing the content in response to changes in the content.

41. The method of claim 39, wherein the transfer of content comprises block-level, non-sequential transfer of content.

42. The method of claim 41, wherein the transfer of content comprises transferring a first block of the content from a second client device to a first client device and transferring a second block of the content from a third client device to a first client device.

43. The method of claim 1, wherein the plurality of tasks includes a scan task.

44. The method of claim 43, wherein the scan task includes the agent recursively monitoring a library corresponding to the agent and reporting to the platform any changes to the library.

45. The method of claim 44, wherein the reporting comprises placing a file of the library that includes the changes in a local database of the client device hosting the agent, and providing the metadata of the local database to the platform.

46. The method of claim 1, wherein the plurality of tasks includes a write task.

47. The method of claim 46, wherein the write task includes the agent copying at least one blob of a file from a first location to a second location, wherein each of the first location and second location correspond to client devices coupled to the grid.

48. The method of claim 47, wherein the at least one blob comprises a hash of a fragment of a file in the content, wherein the fragment is a component of the file.

49. The method of claim 46, wherein the write task comprises conditions of completion.

50. The method of claim 49, wherein the conditions of completion comprise at least one of retrieving the blob corresponding to the write task and identifying that the blob to be overwritten during the write task corresponds to a correct file.

51. The method of claim 1, wherein the plurality of tasks comprises an upload task that includes copying a file of the content from a device accessible by the agent to a remote storage device.

52. The method of claim 51, comprising the agent reporting to the platform addition of the file to the content accessible by the agent and, in response, the platform assigns a task to the agent to upload the file.

53. The method of claim 52, comprising in response to the task the agent determining if the file is present at the remote storage device, and uploads the file to the remote storage device when the file is determined to be absent.

54. The method of claim 51, wherein the upload task includes the agent copying at least one blob of a file from the device accessible by the agent to the remote storage device.

55. The method of claim 54, wherein the at least one blob comprises a hash of a fragment of the file, wherein the fragment is a component of the file.

56. The method of claim 1, wherein the plurality of tasks includes a delete task.

57. The method of claim 1, wherein a task comprises a plurality of phases including at least one of queued, pending, and completed, wherein the platform tracks the phase of each task of the plurality of tasks.

58. The method of claim 1, comprising each agent maintaining locally at the client device tasks assigned to the agent.

59. The method of claim 58, comprising the agent periodically polling the platform to identify assigned tasks.

60. The method of claim 1, wherein an agent comprises a hierarchy for locating task information needed to complete a task and located at a remote device.

61. The method of claim 60, wherein the hierarchy comprises the agent searching a local database of the client device hosting the agent.

62. The method of claim 61, wherein the hierarchy comprises the agent communicating with at least one peer agent of the plurality of agents to locate the task information.

63. The method of claim 62, wherein the agent comprises identity of peer agents that possess the task information.

64. The method of claim 62, wherein the hierarchy comprises the agent retrieving the task information from a remote storage device.

65. The method of claim 64, comprising the agent receiving from the platform the identity of peer agents in an ordered list and searching for the task information in accordance with the ordered list.

66. The method of claim 1, wherein each agent includes a plurality of components executing in parallel.

67. The method of claim 66, wherein the plurality of components include a provider component that retrieves tasks designated for the agent from the platform and stores retrieved tasks in a task database local to the client device hosting the agent.

68. The method of claim 67, wherein the plurality of components comprise a task execution component.

69. The method of claim 68, wherein the plurality of components include a runner component that monitors the task database, retrieves each task from the task database, and provides a retrieved task to the task execution component and designates the retrieved task to have a pending status.

70. The method of claim 69, comprising the task execution component executing the task, and reports status of task execution to the runner component.

71. The method of claim 70, comprising the runner component reporting the status to the task database.

72. The method of claim 71, wherein the plurality of components include an update component that monitors the task database for tasks having a completed status, and reports status information of completed tasks to the platform.

73. The method of claim 72, comprising the platform updating the plurality of databases in response to the status information.

74. The method of claim 1, comprising the plurality of agents generating the metadata, wherein metadata generated by an agent corresponds to the content to which the agent has access.

75. The method of claim 74, comprising the agent generating the metadata by scanning content of each file to which the agent has access.

76. The method of claim 75, comprising the agent generating the metadata by splitting the content of the file into a plurality of fragments, wherein each fragment comprises a variable size component of the file.

77. The method of claim 76, wherein the variable size fragments are between a pre-specified minimum length and maximum length.

78. The method of claim 76, comprising the agent generating the metadata by generating a plurality of blobs that represent the plurality of fragments, wherein each blob represents a fragment.

79. The method of claim 76, comprising the agent generating the plurality of blobs using a blob hash, wherein the blob hash comprises, for each byte in the content, running a hash algorithm over components of the content, wherein the hash algorithm is set to identify a specified pattern of data.

80. The method of claim 79, wherein the generating of the blob comprises generating a description of the blob that includes a value of a hash at a point where the fragment represented by the blob was separated from a remaining portion of the file.

81. The method of claim 80, wherein the generating of the blob comprises generating an offset value based on a break point of the fragment represented by the blob.

82. The method of claim 81, wherein the generating of the blob comprises generating a hash of complete contents of the blob, wherein the hash of the complete contents of the blob is an identifier for the blob.

83. The method of claim 82, wherein the generating of the blob comprises generating a list of blobs representing the content of the file.

84. The method of claim 83, wherein the generating of the blob includes generating a content hash that comprises a hash of the list of blobs representing the content of the file, wherein the content hash is an identifier for the file.

85. The method of claim 84, wherein the generating of the blob includes generating a name hash that comprises a hash of a file name corresponding to the file.

86. The method of claim 85, wherein the generating of the blob includes generating a file hash that comprises a hash of a combination of the content hash and a name hash.

87. The method of claim 86, wherein the generating of the blob includes generating a path hash that comprises a hash of the file name and a file path corresponding to the content of the file.

88. The method of claim 87, wherein the generating of the blob includes generating a metadata hash that comprises a hash of file metadata of the file.

89. The method of claim 88, comprising the platform generating a record for the file, wherein the record comprises blob hashes of the file, the content hash, the file hash, the path hash and the metadata hash.

90. The method of claim 89, wherein the plurality of databases include a libraries database, wherein the libraries database comprises the record.

91. The method of claim 79, wherein the generating of the blob comprises generating a size of the blob.

92. The method of claim 79, wherein the file is described as a list of blobs comprising the file.

93. The method of claim 79, comprising each agent storing a blob locally at the client device hosting the agent, and transfers a blob that is previously unreported to central storage of the platform.

94. The method of claim 1, wherein the platform comprises a policy database and a rules engine.

95. The method of claim 1, comprising analyzing each file of the content.

96. The method of claim 95, comprising delineating each file of the content as at least one of business content and personal content.

97. The method of claim 96, comprising determining for the business content a confidentiality level of each file of the content.

98. The method of claim 96, comprising scanning and extracting key terms from each file of the content.

99. The method of claim 98, comprising comparing the key terms across an enterprise and generating a list of enterprise-specific key terms.

100. The method of claim 98, wherein the determining of the confidentiality level comprises identifying specific key terms of the key terms.

101. The method of claim 97, wherein the generating of the metadata comprises generating the metadata to include the confidentiality level of corresponding content.

102. The method of claim 97, comprising controlling access to each file of the content based on the confidentiality level.

103. The method of claim 102, wherein the controlling of the access comprises controlling viewing of each file of the content.

104. The method of claim 102, wherein the controlling of the access comprises controlling downloading of each file of the content.

105. The method of claim 102, wherein the controlling of the access comprises controlling accessing of each file of the content.

106. The method of claim 102, wherein the controlling of the access comprises controlling copying of each file of the content.

107. The method of claim 102, wherein the controlling of the access comprises controlling distributing of each file of the content.

108. The method of claim 95, comprising delineating each file of the content based on inferences made from the content.

109. The method of claim 95, comprising delineating each file of the content based on syntax of the content.

110. The method of claim 95, comprising identifying business content of the content across at least one of the locations and the plurality of agents, wherein the identifying of the business content comprises using at least one of document name, document size, proximity, key word comparison, and hash comparison.

111. The method of claim 1, comprising controlling collaboration among a plurality of devices accessing a file of the content.

112. The method of claim 111, comprising controlling editing of content among a plurality of devices simultaneously editing a file of the content.

113. The method of claim 111, comprising tracking activity involving a file of the content.

114. The method of claim 111, comprising tracking revision history of a file of the content.

115. The method of claim 1, comprising mobile device management that includes monitoring and controlling access to the content via mobile devices.

116. The method of claim 115, wherein the mobile device management comprises tracking location of a mobile device.

117. The method of claim 116, wherein the mobile device management comprises controlling access to the content based on the location.

118. The method of claim 115, wherein the mobile device management comprises tracking data of a mobile device.

119. The method of claim 1, comprising coupling a console to the platform, wherein the console includes automated activity monitoring, auditing, and reporting involving the content.

120. The method of claim 119, comprising controlling via the console activity involving the content.

121. The method of claim 119, comprising controlling via the console the location.

122. The method of claim 120, wherein the controlling of the activity comprises at least one of controlling viewing of each file of the content, controlling downloading of each file of the content, controlling accessing of each file of the content, controlling copying of each file of the content, and controlling distributing of each file of the content.

123. A method comprising:
coupling a platform comprising a processor and a rules engine to a plurality of databases including a policy database comprising one or more service policies;
forming a grid comprising a plurality of agents coupled to the platform, wherein each agent is an agent of the platform running on a client device;
generating metadata at each agent by hashing a plurality of fragments of content accessible by the agent, wherein the metadata corresponds to the content of memory accessible by a plurality of client devices corresponding to the plurality of agents;
providing the metadata to the platform instead of the content and using the metadata at the platform to track a location of the content and manage distributed storage, movement and processing of the content among the plurality of agents;
generating a plurality of tasks including tasks controlling at least one of storing, transferring and processing of the content, wherein a task is a processing operation performed on content accessible by the agent responsible for the task, wherein the plurality of tasks is generated by the platform using information of the metadata;
assigning each task of the plurality of tasks to an agent of the plurality of agents having access to content that corresponds to the task, wherein each task is a processing operation directed by the platform to be performed by an agent on content accessible by the agent and wherein each task assigned by the platform to the agent is based on the one or more service policies.

124. A method comprising:
coupling a platform comprising a processor and a rules engine to a plurality of databases including a policy database comprising one or more service policies;
forming a grid comprising a plurality of agents coupled to the platform, wherein each agent is an agent of the platform running on a client device;
providing to the platform by each agent of each client device metadata of content of memory accessible by the client device;
using the metadata at the platform to track a location of the content and manage distributed storage, movement and processing of the content among the plurality of agents;
generating goals representing operations for maintaining a state of the content, wherein the goals are generated by the platform using information of the metadata;
generating a plurality of tasks corresponding to the goals, wherein the plurality of tasks is generated by the platform using information of the metadata;
assign each task to an agent having access to content that corresponds to the task, wherein each task assigned by the platform to the agent is based on the one or more service policies.

125. A method comprising:
establishing a coupling between a platform comprising a processor and a rules engine and a plurality of databases including a policy database comprising one or more service policies;
forming a grid by coupling a plurality of agents to the platform, wherein each agent of the plurality of agents is an agent of the platform running on a client device and wherein the platform comprises data store indexes which index data blocks located across the grid and is configured to perform block level file transfers by moving data blocks within the grid;
generating metadata at each agent representing content of memory accessible by a plurality of client devices corresponding to the plurality of agents, wherein the generating comprises hashing a plurality of fragments of the content to generate a plurality of blobs representing the plurality of fragments;
providing the metadata to the platform instead of the content and using the metadata at the platform to track a location of the content and manage distributed storage, movement and processing of the content among the plurality of agents;
generating a plurality of tasks, wherein a task is a processing operation performed on content accessible by the agent responsible for the task;
assigning each task of the plurality of tasks to an agent of the plurality of agents having access to content that corresponds to the task, wherein each task assigned by the platform to the agent is based on the one or more service policies.

* * * * *